US011000810B2

(12) United States Patent
Ho et al.

(10) Patent No.: US 11,000,810 B2
(45) Date of Patent: May 11, 2021

(54) BORATE-CONTAINING MEMBRANES FOR GAS SEPARATION

(71) Applicant: Ohio State Innovation Foundation, Columbus, OH (US)

(72) Inventors: W. S. Winston Ho, Columbus, OH (US); Varun Vakharia, Columbus, OH (US); Witopo Salim, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 189 days.

(21) Appl. No.: 16/347,143

(22) PCT Filed: Nov. 1, 2017

(86) PCT No.: PCT/US2017/059505
§ 371 (c)(1),
(2) Date: May 2, 2019

(87) PCT Pub. No.: WO2018/085377
PCT Pub. Date: May 11, 2018

(65) Prior Publication Data
US 2020/0055003 A1  Feb. 20, 2020

Related U.S. Application Data

(60) Provisional application No. 62/416,434, filed on Nov. 2, 2016.

(51) Int. Cl.
*B01D 69/14* (2006.01)
*B01D 69/02* (2006.01)
(Continued)

(52) U.S. Cl.
CPC ......... *B01D 69/145* (2013.01); *B01D 53/228* (2013.01); *B01D 69/02* (2013.01);
(Continued)

(58) Field of Classification Search
None
See application file for complete search history.

(56) References Cited

U.S. PATENT DOCUMENTS 3,712,025 A   1/1973  Wallace
3,851,041 A   11/1974 Eickmeyer
(Continued)

FOREIGN PATENT DOCUMENTS

WO   2000/002844 A1   1/2000
WO   2016/057918 A1   4/2016

OTHER PUBLICATIONS

Y. Zhao and W. S. W. Ho, "CO2-selective membranes containing sterically hindered amines for CO2/H2 separation", Ind. Eng. Chem. Res., 52, 8774-8782 (2013).
(Continued)

*Primary Examiner* — Daniel Berns
(74) *Attorney, Agent, or Firm* — Meunier Carlin & Curfman LLC

(57) ABSTRACT

Membranes, methods of making the membranes, and methods of using the membranes are described herein. The membranes can comprise a support layer, and a selective polymer layer disposed on the support layer. The selective polymer layer can comprise an oxidatively stable carrier and a borate additive dispersed within a hydrophilic polymer matrix. The oxidatively stable carrier can comprise a quaternaryammonium hydroxide carrier (e.g., a mobile carrier such as a small molecule quaternaryammonium hydroxide, or a fixed carrier such as a quaternaryammonium hydroxide-containing polymer), a quaternaryammonium fluoride carrier (e.g., a mobile carrier such as a small molecule quaternaryammonium fluoride, or a fixed carrier such as a quaternaryammonium fluoride-containing polymer), or a combination thereof. The borate additive can comprise a borate salt, a boric acid, or a combination thereof. The
(Continued)

membranes can exhibit selective permeability to gases. As such, the membranes can be for the selective removal of carbon dioxide and/or hydrogen sulfide from hydrogen and/or nitrogen.

22 Claims, 10 Drawing Sheets

(51) Int. Cl.
  *B01D 69/10* (2006.01)
  *B01D 53/22* (2006.01)
  *B01D 71/38* (2006.01)
  *B01D 71/40* (2006.01)
  *B01D 71/70* (2006.01)
  *B01J 31/14* (2006.01)

(52) U.S. Cl.
  CPC .......... *B01D 69/10* (2013.01); *B01D 69/142* (2013.01); *B01D 71/38* (2013.01); *B01D 71/40* (2013.01); *B01D 71/70* (2013.01); *B01J 31/146* (2013.01); *B01D 2255/707* (2013.01); *B01D 2325/10* (2013.01); *B01D 2325/16* (2013.01)

(56) References Cited

U.S. PATENT DOCUMENTS

| | | |
|---|---|---|
| 3,896,015 A | 7/1975 | McRae |
| 3,907,969 A | 9/1975 | Field |
| 4,117,079 A | 9/1978 | Bellows |
| 4,271,132 A | 6/1981 | Eickmeyer |
| 4,430,312 A | 2/1984 | Eickmeyer |
| 4,780,114 A | 10/1988 | Quinn et al. |
| 5,336,298 A | 8/1994 | Quinn et al. |
| 5,611,843 A | 3/1997 | Ho |
| 5,800,624 A | 9/1998 | Smith et al. |
| 6,391,286 B1 * | 5/2002 | Mitra ............... A61K 6/20 424/54 |
| 6,579,331 B1 * | 6/2003 | Ho ............... C01B 3/48 48/198.3 |
| 2007/0286783 A1 | 12/2007 | Carrette et al. |
| 2014/0165837 A1 | 6/2014 | Kimura et al. |
| 2017/0056839 A1 | 3/2017 | Green |

OTHER PUBLICATIONS

M. M. Sharma and P. V. Danckwerts, "Catalysis by bronsted bases of the reaction between CO2 and water", Trans. Faraday Soc., 59, 386-395 (1963).

A. G. Eickmeyer, "For bulk removal of acid gases, costs favor the hot-carbonate process", Chem. Eng., 65, 113-116 (1958).

U. Ghosh, S. Kentish, and G. Stevens, "Absorption of carbon dioxide into aqueous potassium carbonate promoted by boric acid", Energy Procedia, 1, 1075-1081 (2009).

D. Fărcaşiu and D. Hancu, "Acid strength of tetrafluoroboric acid", J. Chem. Soc. Faraday Trans., 93, 2161-2165 (1997).

International Preliminary Report on Patentability issued for Application No. PCT/US2017/059505, dated May 16, 2019.

International Search Report and Written Opinion. Issued by the International Searching Authority/US in PCT Application No. PCT/US2017/059505 dated Apr. 12, 2018. 11 pages.

* cited by examiner

BORATE-CONTAINING MEMBRANES FOR GAS SEPARATION

CROSS-REFERENCE TO RELATED APPLICATIONS

This application is a national stage application filed under 35 U.S.C. § 371 of PCT/US2017/059505 filed Nov. 1, 2017, which claims the benefit of priority to U.S. Provisional Application 62/416,434, filed Nov. 2, 2016, which is incorporated by reference herein in its entirety.

BACKGROUND

There are numerous industrial processes that produce gas streams containing carbon dioxide, hydrogen sulfide, and hydrogen chloride, or gas streams containing carbon dioxide, nitrogen oxides, and sulfur oxides. It is often desirable to remove one or more of these gases from the other components of the gas streams, such as hydrogen and nitrogen. Selectively permeable polymeric membranes have been investigated for a variety of gas separation applications, including hydrogen purification and carbon dioxide sequestration. However, existing selectively permeable polymeric membranes are readily oxidized when contacted with air (e.g., such as a sweep gas) at elevated temperatures. As a consequence, existing membranes are unsuitable for many applications. Thus, there remains a need in the art for membranes, methods of making membranes, and methods of separating gases.

SUMMARY

Membranes, methods of making the membranes, and methods of using the membranes are described herein. The membranes can comprise a support layer, and a selective polymer layer disposed on the support layer. The selective polymer layer can comprise an oxidatively stable carrier and a borate additive dispersed within a hydrophilic polymer matrix. The oxidatively stable carrier can comprise a quaternaryammonium hydroxide carrier, a quaternaryammonium fluoride carrier, or a combination thereof. The membranes can exhibit selective permeability to gases. For example, the membranes can be used to selectively remove carbon dioxide and/or hydrogen sulfide from hydrogen and/or nitrogen. Further, the membranes can exhibit oxidative stability at temperatures above 100° C. As such, the membranes can be compatible with the use of air as a sweep gas at temperatures above 100° C.

The support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone or polysulfone. In certain cases, the support layer can comprise a gas permeable polymer disposed on a base (e.g., a nonwoven fabric such as a polyester nonwoven).

The selective polymer layer can comprise an oxidatively stable carrier dispersed within a hydrophilic polymer matrix. The oxidatively stable carrier can be chosen from a quaternaryammonium hydroxide carrier, a quaternaryammonium fluoride carrier, and combinations thereof. The oxidatively stable carrier can comprise a mobile carrier (e.g., a small molecule having a molecular weight of 600 Daltons or less, such as a small molecule quaternaryammonium hydroxide and/or a small molecule quaternaryammonium fluoride), a fixed carrier (e.g., a polymeric carrier such as a quaternaryammonium hydroxide-containing polymer and/or a quaternaryammonium fluoride-containing polymer), or a combination thereof. In certain embodiments, the oxidatively stable carrier can comprise one or more mobile carriers (e.g., one or more small molecule quaternaryammonium hydroxides, one or more small molecule quaternaryammonium fluorides, or a blend of one or more small molecule quaternaryammonium hydroxides and one or more small molecule quaternaryammonium fluorides). In certain embodiments, the oxidatively stable carrier can comprise one or more fixed carriers (e.g., one or more quaternaryammonium hydroxide-containing polymers, one or more quaternaryammonium fluoride-containing polymers, or a blend of one or more quaternaryammonium hydroxide-containing polymers and one or more quaternaryammonium fluoride-containing polymers).

In certain embodiments, the oxidatively stable carrier can comprise one or more mobile carriers (e.g., one or more small molecule quaternaryammonium hydroxides, one or more small molecule quaternaryammonium fluorides, or a blend of one or more small molecule quaternaryammonium hydroxides and one or more small molecule quaternaryammonium fluorides) and one or more fixed carriers (e.g., one or more quaternaryammonium hydroxide-containing polymers, one or more quaternaryammonium fluoride-containing polymers, or a blend of one or more quaternaryammonium hydroxide-containing polymers and one or more quaternaryammonium fluoride-containing polymers).

The quaternaryammonium hydroxide carrier can be chosen from a small molecule quaternaryammonium hydroxide, a quaternaryammonium hydroxide-containing polymer, and combinations thereof. In some cases, the oxidatively stable carrier can comprise a small molecule quaternaryammonium hydroxide chosen from tetramethylquaternaryammonium hydroxide, tetraethylquaternaryammonium hydroxide, tetrapropylquaternaryammonium hydroxide, tetrabutylquaternaryammonium hydroxide, and combinations thereof. In some cases, the oxidatively stable carrier can comprise a quaternaryammonium hydroxide-containing polymer chosen from poly(diallyldimethylquaternaryammonium hydroxide), poly(vinylbenzyltrimethylquaternaryammonium hydroxide), poly(2-vinyl-1-methylpyridinium hydroxide), poly(acrylamide-N-propyltrimethylquaternaryammonium hydroxide), poly(2-methacryloxyethyltrimethylquaternaryammonium hydroxide), poly(3-chloro-2-hydroxypropyl-2-methacryloxyethyldimethylquaternaryammonium hydroxide), copolymers thereof, and blends thereof.

The quaternaryammonium fluoride carrier can be chosen from a small molecule quaternaryammonium fluoride, a quaternaryammonium fluoride-containing polymer, and combinations thereof. In some cases, the oxidatively stable carrier can comprise a small molecule quaternaryammonium fluoride chosen from tetramethylquaternaryammonium fluoride, tetraethylquaternaryammonium fluoride, tetrapropylquaternaryammonium fluoride, tetrabutylquaternaryammonium fluoride, cesium fluoride, potassium fluoride, sodium fluoride, lithium fluoride, and combinations thereof. In some cases, the oxidatively stable carrier can comprise a quaternaryammonium fluoride-containing polymer chosen from poly(diallyldimethylquaternaryammonium fluoride), poly(vinylbenzyltrimethylquaternaryammonium fluoride), poly(2-vinyl-1-methylpyridinium fluoride), poly(acrylamide-N-propyltrimethylquaternaryammonium fluoride), poly(2-methacryloxyethyl-trimethylquaternaryammonium fluoride), poly(3-chloro-2-hydroxypropyl-2-methacryloxyethyldimethylquaternaryammonium fluoride), copolymers thereof, and blends thereof.

The selective polymer layer can further comprise a borate additive dispersed within a hydrophilic polymer matrix. The borate additive can comprise a borate salt, a boric acid, or a combination thereof. In some embodiments, the borate additive can comprise a borate salt chosen from sodium tetraborate (STB), sodium tetrafluoroborate (STFB), potassium tetraborate (KTB), potassium tetrafluoroborate (KTFB), lithium tetraborate (LTB), lithium tetrafluoroborate (LTFB), cesium tetraborate (CTB), cesium tetrafluoroborate (CTFB), sodium dihydrogenborate (SDHB), potassium dihydrogenborate (KDHB), lithium dihydrogenborate (LDHB), sodium potassium hydrogen borate (SKHB), sodium lithium hydrogen borate (SLHB), potassium lithium hydrogen borate (KLHB), tetramethylquaternaryammonium tetraborate (TMQ-TB), tetraethylquaternaryammonium tetraborate (TEQ-TB), tetrapropylquaternaryammonium tetraborate (TPQ-TB), tetrabutylquaternaryammonium tetraborate (TBQ-TB), tetramethylquaternaryammonium tetrafluoroborate (TMQ-TFB), tetraethylquaternaryammonium tetrafluoroborate (TEQ-TFB), tetrapropylquaternaryammonium tetrafluoroborate (TPQ-TFB), tetrabutylquaternaryammonium tetrafluoroborate (TBQ-TFB), and combinations thereof. In some embodiments, the borate additive can comprise a boric acid chosen from tetrafluoroboric acid (TFBA), boric acid (BA), and combinations thereof.

The hydrophilic polymer matrix can comprise a crosslinked hydrophilic polymer. In some cases, the hydrophilic polymer matrix can comprise a polymer chosen from the group consisting of polyvinyl alcohol, polyvinyl acetate, polyalkylene oxides such as polyethylene oxide, polyvinylpyrrolidone, polysiloxanes, copolymers thereof, and blends thereof. In some cases, the hydrophilic polymer matrix can comprise polyvinyl alcohol. In some cases, the hydrophilic polymer matrix can comprise polyvinyl alcohol-polysiloxane.

Optionally, the membrane can include one or more additional layers. For example, in some embodiments, the membrane can further comprise a permeable layer disposed between the support layer and the selective polymer layer. In some embodiments, the membrane can further comprise a permeable layer disposed on the selective polymer layer. When present, the permeable layer(s) can comprise a gas permeable polymer chosen from poly(dimethylsiloxane), poly(trimethylsilylpropyne), poly(4-methyl-1-pentene), copolymers thereof, and blends thereof.

Also provided are methods for making and using the membranes described herein. For example, provided are methods for separating a first gas from a feed gas comprising the first gas and one or more additional gases (e.g., at least a second gas). The method can include contacting any of the disclosed membranes with the feed gas under conditions effective to afford transmembrane permeation of the first gas.

DETAILED DESCRIPTION

Figure 1:
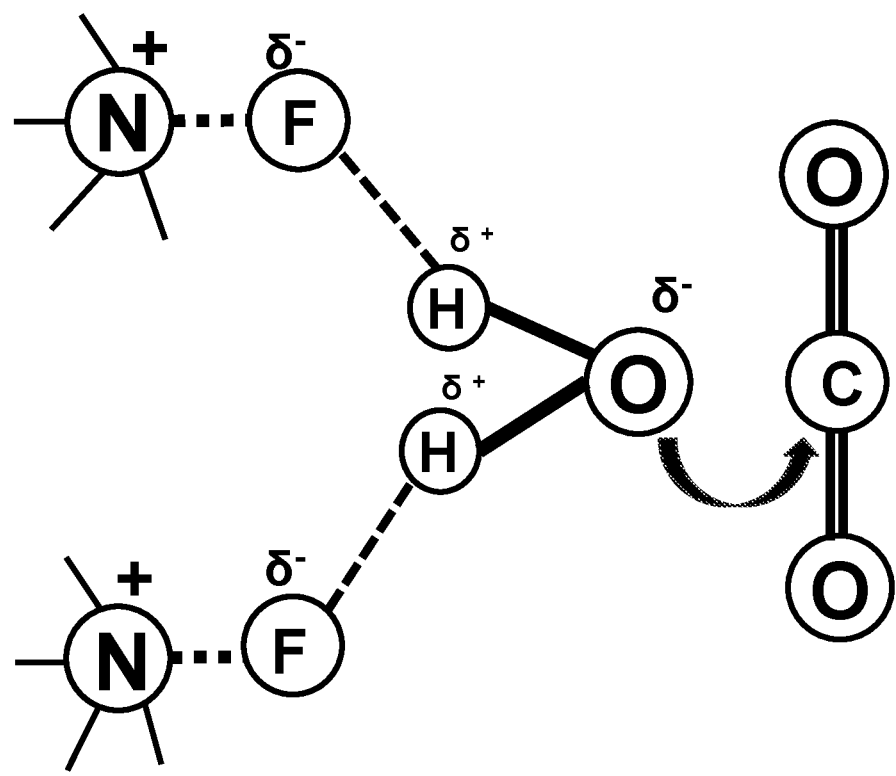
FIG. 1 is a schematic diagram illustrating the interaction between a water molecule and fluoride ions.

Membranes, methods of making the membranes, and methods of using the membranes are described herein. The membranes can comprise a support layer, and a selective polymer layer disposed on the support layer. The selective polymer layer can comprise an oxidatively stable carrier and a borate additive dispersed within a hydrophilic polymer matrix. The oxidatively stable carrier can comprise a quaternaryammonium hydroxide carrier, a quaternaryammonium fluoride carrier, or a combination thereof. The membranes can exhibit selective permeability to gases. For example, the membranes can be used to selectively remove carbon dioxide and/or hydrogen sulfide from hydrogen and/or nitrogen. Further, the membranes can exhibit oxidative stability at temperatures above 100° C. As such, the membranes can be compatible with the use of air as a sweep gas at temperatures above 100° C.

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

The membranes can further include a selective polymer layer disposed on the support layer. In some cases, the selective polymer layer can be a selective polymer through which gas permeates via diffusion or facilitated diffusion. The selective polymer layer can comprise a selective polymer having a $CO_2:H_2$ selectivity of at least 20 at 120° C. For example, the selective polymer can have a $CO_2:H_2$ selectivity of at least 25 at 120° C. (e.g., at least 50 at 120° C., at least 75 at 120° C., at least 100 at 120° C., at least 125 at 120° C., at least 150 at 120° C., at least 175 at 120° C., at least 200 at 120° C., at least 225 at 120° C., or at least 300 at 120° C.). In some embodiments, the selective polymer can comprise a selective polymer that has a $CO_2:H_2$ selectivity of 300 or less at 120° C. (e.g., 250 or less at 120° C.). In certain embodiments, the selective polymer can comprise a selective polymer that has a $CO_2:H_2$ selectivity ranging from any of the minimum values described above to any of the maximum values described above. For example, in certain embodiments, the selective polymer can comprise a selective polymer that has a $CO_2:H_2$ selectivity of from 20 to 300 at 120° C. (e.g., 20 to 250 at 120° C., from 25 to 300 at 120° C., from 25 to 250 at 120° C., from 50 to 200 at 120° C., or from 75 to 150 at 120° C.). The $CO_2:H_2$ selectivity of the selective polymer can be measured using standard methods for measuring gas permeance known in the art, such as those described in the examples below.

The selective polymer layer can comprise an oxidatively stable carrier dispersed within a hydrophilic polymer matrix. The oxidatively stable carrier can be chosen from a quaternaryammonium hydroxide carrier, a quaternaryammonium fluoride carrier, and combinations thereof. The oxidatively stable carrier can comprise a mobile carrier (e.g., a small molecule, such as a small molecule quaternaryammonium hydroxide and/or a small molecule quaternaryammonium fluoride), a fixed carrier (e.g., a polymer such as a quaternaryammonium hydroxide-containing polymer and/or a quaternaryammonium fluoride-containing polymer), or a combination thereof. In certain embodiments, the oxidatively stable carrier can comprise one or more mobile carriers (e.g., one or more small molecule quaternaryammonium hydroxides, one or more small molecule quaternaryammonium fluorides, or a blend of one or more small molecule quaternaryammonium hydroxides and one or more small molecule quaternaryammonium fluorides). In certain embodiments, the oxidatively stable carrier can comprise one or more fixed carriers (e.g., one or more quaternaryammonium hydroxide-containing polymers, one or more quaternaryammonium fluoride-containing polymers, or a blend of one or more quaternaryammonium hydroxide-containing polymers and one or more quaternaryammonium fluoride-containing polymers).

In certain embodiments, the oxidatively stable carrier can comprise one or more mobile carriers (e.g., one or more small molecule quaternaryammonium hydroxides, one or more small molecule quaternaryammonium fluorides, or a blend of one or more small molecule quaternaryammonium hydroxides and one or more small molecule quaternaryammonium fluorides) and one or more fixed carriers (e.g., one or more quaternaryammonium hydroxide-containing polymers, one or more quaternaryammonium fluoride-containing polymers, or a blend of one or more quaternaryammonium hydroxide-containing polymers and one or more quaternaryammonium fluoride-containing polymers).

The term "small molecule", as used herein, refers to a molecule, such as an organic compound, with a molecular weight of less than about 1,000 Daltons (e.g., less than about 800 Daltons, less than about 750 Daltons, less than about 600 Daltons, or less than about 500 Daltons).

In some cases, the quaternaryammonium hydroxide carrier can be chosen from a small molecule quaternaryammonium hydroxide, a quaternaryammonium hydroxide-containing polymer, and combinations thereof. In some cases, the oxidatively stable carrier can comprise a small molecule quaternaryammonium hydroxide. Suitable examples of small molecule quaternaryammonium hydroxides include, but are not limited to, tetramethylquaternaryammonium hydroxide, tetraethylquaternaryammonium hydroxide, tetrapropylquaternaryammonium hydroxide, tetrabutylquaternaryammonium hydroxide, and combinations thereof. In some cases, the oxidatively stable carrier can comprise a quaternaryammonium hydroxide-containing polymer. The quaternaryammonium hydroxide-containing polymer can have any suitable molecular weight. For example, the quaternaryammonium hydroxide-containing polymer can have a weight average molecular weight of from 5,000 Da to 2,000,000 Da, or from 50,000 Da to 200,000 Da. Suitable examples of quaternaryammonium hydroxide-containing polymers include, but are not limited to, poly(diallyldimethylquaternaryammonium hydroxide), poly(vinylbenzyltrimethylquaternaryammonium hydroxide), poly(2-vinyl-1-methylpyridinium hydroxide), poly(acrylamide-N-propyltrimethylquaternaryammonium hydroxide), poly(2-methacryloxyethyltrimethylquaternaryammonium hydroxide), poly(3-chloro-2-hydroxypropyl-2-methacryloxyethyldimethylquaternaryammonium hydroxide), copolymers thereof, and blends thereof. In some embodiments when the oxidatively stable carrier comprises a quaternaryammonium hydroxide-containing polymer, the hydrophilic polymer is absent from the selective polymer layer. In some embodiments when the oxidatively stable carrier compound comprises a quaternaryammonium hydroxide-containing polymer, the selective polymer layer can comprise a blend of a quaternaryammonium hydroxide-containing polymer and a hydrophilic polymer (e.g., a quaternaryammonium hydroxide-containing polymer dispersed in a hydrophilic polymer matrix).

In some embodiments when the oxidatively stable carrier comprises a quaternaryammonium hydroxide-containing polymer, the selective polymer layer can comprise a blend of a quaternaryammonium hydroxide-containing polymer, one or more additional oxidatively stable carriers (e.g., a small molecule quaternaryammonium hydroxide, small molecule quaternaryammonium fluoride, a quaternaryammonium fluoride-containing polymer, or a combination thereof) and a hydrophilic polymer (e.g., a quaternaryammonium hydroxide-containing polymer and one or more additional oxidatively stable carriers dispersed in a hydrophilic polymer matrix).

In some cases, the quaternaryammonium fluoride carrier can be chosen from a small molecule quaternaryammonium fluoride, a quaternaryammonium hydroxide-fluoride polymer, and combinations thereof. In some cases, the oxidatively stable carrier can comprise a small molecule quaternaryammonium fluoride. Suitable examples of small molecule quaternaryammonium fluorides include, but are not limited to, tetramethylquaternaryammonium fluoride, tetraethylquaternaryammonium fluoride, tetrapropylquaternaryammonium fluoride, tetrabutylquaternaryammonium fluoride, and combinations thereof, as well as small molecule fluoride analogs such as cesium fluoride, potassium fluoride, sodium fluoride, lithium fluoride, and combinations thereof. In some cases, the oxidatively stable carrier can comprise a quaternaryammonium fluoride-containing polymer. The quaternaryammonium fluoride-containing polymer can have any suitable molecular weight. For example, the quaternaryammonium fluoride-containing polymer can have a weight average molecular weight of from 5,000 Da to 2,000,000 Da, or from 50,000 Da to 200,000 Da. Suitable examples of quaternaryammonium fluoride-containing polymers include, but are not limited to, poly(diallyldimethylquaternaryammonium fluoride), poly(vinylbenzyltrimethylquaternaryammonium fluoride), poly(2-vinyl-1-methylpyridinium fluoride), poly(acrylamide-N-propyltrimethylquaternaryammonium fluoride), poly(2-methacryloxyethyltrimethylquaternaryammonium fluoride), poly(3-chloro-2-hydroxypropyl-2-methacryloxyethyldimethylquaternaryammonium fluoride), copolymers thereof, and blends thereof. In some embodiments when the oxidatively stable carrier comprises a quaternaryammonium fluoride-containing polymer, the hydrophilic polymer is absent from the selective polymer layer. In some embodiments when the oxidatively stable carrier compound comprises a quaternaryammonium fluoride-containing polymer, the selective polymer layer can comprise a blend of a quaternaryammonium fluoride-containing polymer and a hydrophilic polymer (e.g., a quaternaryammonium fluoride-containing polymer dispersed in a hydrophilic polymer matrix).

In some embodiments when the oxidatively stable carrier comprises a quaternaryammonium fluoride-containing polymer, the selective polymer layer can comprise a blend of a quaternaryammonium fluoride-containing polymer, one or more additional oxidatively stable carriers (e.g., a small molecule quaternaryammonium hydroxide, small molecule quaternaryammonium fluoride, a quaternaryammonium hydroxide-containing polymer, or a combination thereof) and a hydrophilic polymer (e.g., a quaternaryammonium fluoride-containing polymer and one or more additional oxidatively stable carriers dispersed in a hydrophilic polymer matrix).

The selective polymer layer can comprise any suitable amount of the oxidatively stable carrier. The amount of oxidatively stable carrier can depend on a number of factors, including the identity of the oxidatively stable carrier and the intended application for the membrane. For example, in some embodiments, the hydrophilic polymer can be absent. In these embodiments, the selective polymer layer can comprise from 100% to 80% by weight oxidatively stable carrier, based on the total weight of the components used to form the selective polymer layer. In these cases, the oxidatively stable carrier(s) present in the selective layer include at least one fixed carrier (e.g., a quaternaryammonium hydroxide-containing polymer and/or a quaternaryammonium fluoride-containing polymer). In some cases, the selective polymer layer can comprise from 10% to 90% by weight (e.g., from 10% to 50% by weight) oxidatively stable carrier, based on the total weight of the components used to form the selective polymer layer.

The selective polymer layer can further comprise a borate additive dispersed within a hydrophilic polymer matrix. The borate additive can comprise a single borate additive, or a combination of two or more different borate additives. The borate additive can comprise, for example, a borate salt, a boric acid, or a combination thereof. Examples of suitable borate salts include, for example, sodium tetraborate (STB), sodium tetrafluoroborate (STFB), potassium tetraborate (KTB), potassium tetrafluoroborate (KTFB), lithium tetraborate (LTB), lithium tetrafluoroborate (LTFB), cesium tetraborate (CTB), cesium tetrafluoroborate (CTFB), sodium dihydrogenborate (SDHB), potassium dihydrogenborate (KDHB), lithium dihydrogenborate (LDHB), sodium potassium hydrogen borate (SKHB), sodium lithium hydrogen borate (SLHB), potassium lithium hydrogen borate (KLHB), tetramethylquaternaryammonium tetraborate (TMQ-TB), tetraethylquaternaryammonium tetraborate (TEQ-TB), tetrapropylquaternaryammonium tetraborate (TPQ-TB), tetrabutylquaternaryammonium tetraborate (TBQ-TB), tetramethylquaternaryammonium tetrafluoroborate (TMQ-TFB), tetraethylquaternaryammonium tetrafluoroborate (TEQ-TFB), tetrapropylquaternaryammonium tetrafluoroborate (TPQ-TFB), tetrabutylquaternaryammonium tetrafluoroborate (TBQ-TFB), and combinations thereof. Examples of suitable boric acids include, for example, tetrafluoroboric acid (TFBA), boric acid (BA), and combinations thereof. In certain embodiments, the borate additive can comprise tetrafluoroboric acid or a salt thereof.

The selective polymer layer can comprise any suitable amount of the borate additive. The amount of borate additive can depend on a number of factors, including the identity of the borate additive and the intended application for the membrane. For example, in some embodiments, the selective polymer layer can comprise from 0.1% to 25% by weight (e.g., from 0.1% to 20% by weight, from 0.5% to 15% by weight, from 0.5% to 10% by weight, or from 0.5% to 5% by weight) borate additive, based on the total weight of the components used to form the selective polymer layer.

Optionally, the selective polymer layer can include any suitable hydrophilic polymer. Examples of hydrophilic polymers suitable for use in the selective polymer layer can include polyvinylalcohol, polyvinylacetate, polyalkylene oxides such as polyethylene oxide, polyvinylpyrrolidone, polyamide, cellulosic polymer, sulfonated polysulfone, sulfonated polyethersulfone, copolymers thereof, and blends thereof. In some cases, the hydrophilic polymer matrix can comprise a crosslinked hydrophilic polymer. In some cases, the hydrophilic polymer matrix can comprise polyvinyl alcohol. In some cases, the hydrophilic polymer matrix can comprise polyvinyl alcohol-polysiloxane.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinyl alcohol having a weight average molecular weight of from 50,000 Da to 150,000 Da.

The selective polymer layer can comprise any suitable amount of the hydrophilic polymer. For example, in some cases, the selective polymer layer can comprise from 10% to 90% by weight (e.g., from 10% to 50% by weight) hydrophilic polymer, based on the total weight of the components used to form the selective polymer layer.

In some embodiments, the selective polymer can also include a cross-linking agent. Cross-linking agents suitable for use in the selective polymer can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer can comprise any suitable amount of the cross-linking agent. For example, the selective polymer can comprise 1 to 40 percent cross-linking agents by weight of the selective polymer.

The selective polymer layer can further include a base. The base can act as a catalyst to catalyze the cross-linking of the selective polymer layer (e.g., cross-linking of a hydrophilic polymer and/or cross-linking of a hydrophilic polymer with an amine-containing polymer, a hydroxide-containing polymer and/or a fluoride-containing polymer). In some embodiments, the base can remain in the selective polymer and constitute a part of the selective polymer. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer can comprise any suitable amount of the base. For example, the selective polymer can comprise 1 to 40 percent base by weight of the selective polymer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

Optionally, the membrane can include one or more additional layers. For example, in some embodiments, the membrane can further comprise a permeable layer disposed between the support layer and the selective polymer layer. In some embodiments, the membrane can further comprise a permeable layer disposed on the selective polymer layer. When present, the permeable layer(s) can comprise a gas permeable polymer chosen from poly(dimethylsiloxane), poly(trimethylsilylpropyne), poly(4-methyl-1-pentene), copolymers thereof, and blends thereof.

The total thickness of each layer in the membrane can be chosen such that the structure is mechanically robust, but not so thick as to impair permeability. In some embodiments, the selective layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of making the membranes are also disclosed herein. Methods of making membranes can include depositing a selective polymer layer on a support layer to form a selective layer disposed on the support layer, wherein the selective polymer layer comprises an oxidatively stable carrier and a borate additive dispersed within a hydrophilic polymer matrix, and wherein the oxidatively stable carrier is chosen from a quaternaryammonium hydroxide carrier, a quaternaryammonium fluoride carrier, and combinations thereof.

Optionally, the support layer can be pretreated prior to deposition of the selective layer, for example, to remove water or other adsorbed species using methods appropriate to the support and the adsorbate. Examples of absorbed species are, for example, water, alcohols, porogens, and surfactant templates.

The selective polymer can be prepared by first forming a coating solution of a hydrophilic polymer (when present), an oxidatively stable carrier, a borate additive, and optionally a cross-linking agent and a basic compound in a suitable solvent. One example of a suitable solvent is water. In some embodiments, the amount of water employed will be in the range of from 50% to 99%, by weight of the coating solution. The coating solution can then be used in forming a nonporous selective polymer membrane. The selective polymer can be formed into a nonporous membrane by using any suitable techniques. For example, the coating solution can be coated onto a substrate using any suitable techniques, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from selective polymers containing for example, the hydrophilic polymer, the cross-linking agent, the base, a borate additive, and the oxidatively stable carrier in a suitable solvent can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the selective polymer after solvent removal takes place at about 100° C. to about 180° C., and the cross-linking occurs in from about 1 to about 72 hours.

An additive may be included in the selective polymer before forming the selective layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making the membrane can be scaled to industrial levels.

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof. In certain embodiments, the sweep gas can comprise air. Because of the oxidative stability of the carrier in the membranes discloses herein, air can be used as a sweep gas at temperatures above 100° C. Under these conditions, the membranes are stable, as indicated by the membrane exhibiting less than a 10% change (e.g., less than a 5% change) in $CO_2/H_2$ selectivity over 145 hours of use at 120° C. with air as a sweep gas.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof. In some embodiments, the acid gas may be derived from fossil fuels that require hydrogen purification for fuel cell, electricity generation, and hydrogenation applications, biogas for renewable energy, and natural gas for commercial uses. For example, the membranes may be employed in a fuel cell (e.g., to purify feed gases prior to entering the fuel cell). The membranes can also be used for removal of carbon dioxide from flue gas.

The permeance of the first gas or the acid gas can be at least 50 GPU at 120° C. (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, or 950 GPU or greater at 120° C.). The permeance of the first gas or the acid gas can be 1000 GPU or less at 120° C. (e.g., 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less at 120° C.). The permeance of the first gas or the acid gas through the membrane can vary from any of the minimum values described above to any of the maximum values described above. For example, the permeance of the first gas or the acid gas can be from 50 GPU to 1000 GPU at 120° C. (e.g., from 50 GPU to 500 GPU at 120° C., or from 50 GPU to 300 GPU at 120° C.).

The membrane can exhibit a first gas/second gas selectivity of at least 20 at 120° C. In some embodiments, the membrane can exhibit a first gas/second gas selectivity of up to at least 300 at 120° C. For example, the membrane can exhibit a first gas/second gas selectivity of 25 or greater, 50 or greater, 75 or greater, 100 or greater, 125 or greater, 200 or greater, 225 or greater, 250 or greater at 120° C., or 300 or greater at 120° C. In some embodiments, the permeance and selectivity of the membrane for the first gas or the acid gas can vary at higher or lower temperatures.

By way of non-limiting illustration, examples of certain embodiments of the present disclosure are given below.

EXAMPLES

Overview

Borate-containing membranes are described that include a nanoporous polymeric membrane support layer and a selective polymer layer disposed on the support layer that comprises an oxidatively stable quaternaryammonium hydroxide- or quaternaryammonium fluoride-containing polymer and a borate additive dispersed within a crosslinked polyvinylalcohol or polyvinylalcohol-polysiloxane matrix. The catalytic effect of the borate additive for the $CO_2$-hydration reaction can dramatically enhance selective $CO_2$ transport through the membrane. These membranes can be used for a variety of industrial applications, including synthesis gas purification (removal of $CO_2$ and/or $H_2S$ from synthesis gas), $H_2$ purification from Hz-containing mixtures, $CO_2$ removal from $CH_4$-containing mixtures, and $CO_2$ capture from flue gas in coal- and natural gas-fired power plants.

Background

Fuel combustion is the largest source of $CO_2$ (greenhouse gas) emissions in the United States. It is important to mitigate the $CO_2$ emissions and capture $CO_2$ from flue gas in coal- and natural gas-fired power plants in order to reduce the global warming concerns. One of the ways is by developing an economically feasible $CO_2$ removal technology along with improving the efficiency of energy/electricity generation.

Compared to the other available processes (like absorption, adsorption, and cryogenic distillation) for $CO_2$ removal (from flue gas) and $H_2$ purification (from syngas and other Hz-rich streams), membrane technology appears to be more energy efficient, compact, and easy to operate and retrofit as well as its inherent capability for overcoming thermodynamic equilibrium limitations. Recently, amine-containing membranes with excellent performance and stability for $H_2$ purification have been developed; however, the oxidative degradation of amines by oxygen in the air at high temperatures (>100° C.) has prevented the use of air as the sweep gas.

Hydroxide- and fluoride-containing quaternaryammonium compounds can be used as $CO_2$ carriers to form membranes that exhibit high-temperature $CO_2$-selective transport performance and long-term transport stability in the presence of air as the sweep gas. Herein, the use of borate additives to enhance the performance of the hydroxide- and fluoride-containing membranes is investigated.

The hydroxide-containing compounds (as $CO_2$ carriers) in the membrane react with $CO_2$ via Reaction 1 below. The reaction product, $HCO_3^-$, diffuses from the feed side to the sweep side of the membrane and thus, aids in facilitating the $CO_2$ flux through the membrane via the reaction-diffusion transport mechanism. Moreover, $H_2O$ molecules can also react with $CO_2$ in the membrane as shown in Reaction 2 below. It has been suggested that Reaction 2 is the rate-determining step in $CO_2$ transport. The performance of selectively permeable membranes for $CO_2$ transport can be improved by incorporating a catalyst for Reaction 2, such as a quaternaryammonium fluoride-containing compound. The fluoride ions in such compounds can make the oxygen atom of the water molecule and the hydroxide ion more basic via hydrogen bonding. This increases the rate of reaction with $CO_2$ molecules, especially for Reaction 2.

(1)

(2)

On those grounds, different catalysts have been investigated in the past for the $CO_2$—$H_2O$ reaction. In this example, borate-containing membranes with desirable $CO_2$ permeance and excellent $CO_2/H_2$ selectivity are evaluated. Different borate salts were blended in crosslinked hydrophilic polyvinylalcohol (PVA) or polyvinylalcohol-polysiloxane (PVA-POS) matrix with oxidatively stable quaternaryammonium based hydroxide- and fluoride-containing small molecules and macromolecules as $CO_2$ carriers. These membranes demonstrated significant improvement in the transport performance when tested at 120° C. for $H_2$ purification applications. Various membrane compositions were prepared. These borate catalyzed hydroxide- and fluoride-containing membranes were tested, and the transport performance of these membranes for $CO_2$ removal and $H_2$ purification was examined.

Summary of Results

Borate-containing membranes comprising oxidatively stable quaternaryammonium-based hydroxide and fluoride compounds, and crosslinked polyvinylalcohol (PVA) or crosslinked polyvinylalcohol-polysiloxane (PVA-POS) are described. The membranes can be used for the removal of $CO_2$ and/or hydrogen sulfide, for the purification of hydrogen, syngas and natural gas, and for $CO_2$ capture from flue gas. Methods for lab-scale membrane synthesis, performance, and testing of these membranes at high temperature in presence of air as a sweep gas are detailed.

The membranes can be used for industrial applications, such as $H_2$ purification, natural gas purification, and $CO_2$ removal from flue gas in coal- and natural gas-fired power plants. In the membrane process, the feed gas stream comes in contact with the membrane. The carbon dioxide and/or hydrogen sulfide selectively permeate through the membrane and hence the target gas product, e.g., hydrogen or $CH_4$, in the feed gas stream is purified; for $CO_2$ capture, the concentration of $CO_2$ in the permeate is enriched.

As discussed above, hydroxide- and fluoride-containing membranes facilitate $CO_2$ transport through the membrane via Reactions 1 and 2. The $CO_2$ molecules react with hydroxide and water molecules to generate bicarbonate ions. The reaction of $CO_2$ with hydroxide ions is typically faster (relatively) than the $CO_2$—$H_2O$ reaction (Reaction 2). Thus, the $CO_2$—$H_2O$ reaction is believed to be the rate-determining step. The fluoride ions have a strong affinity for the hydrogen atoms of the water molecule and/or hydroxide ions via hydrogen bonding. This inherently makes the oxygen atom more basic (especially in the case of the water molecule) for the reaction with $CO_2$. The enhanced basicity of the oxygen atom in presence of fluoride ions was evident from the transport performances of the membranes is shown schematically in FIG. 1.

Similarly, borate-containing species can catalyze the $CO_2$—$H_2O$ reaction by making the $H_2O$ molecule more basic. The oxygen atoms of the borate-containing species interact with the hydrogen atoms of the water molecules in a similar manner (via hydrogen bonding) as discussed above, resulting in an increased rate of $CO_2$—$H_2O$ reaction. Here, boric acid and borate salts (potassium salt of dihydrogen borate and sodium tetraborate) were used to demonstrate this phenomenon.

Figure 2:
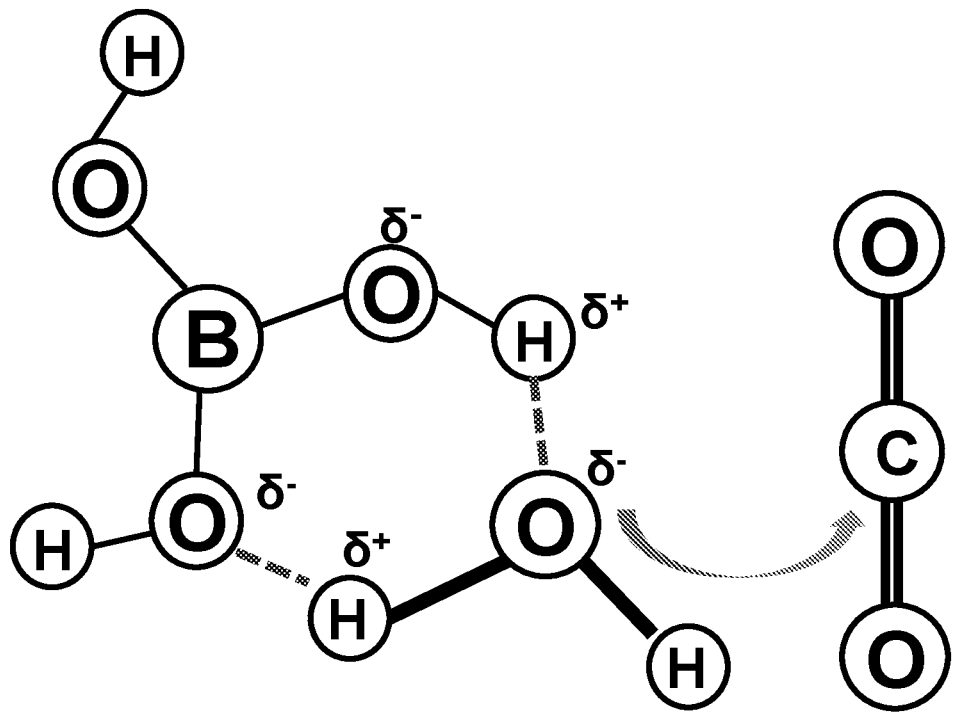
FIG. 2 is a schematic diagram illustrating the interaction between boric acid and a water molecule.

FIG. 2 shows a schematic representation of the interaction of boric acid with a water molecule during the $CO_2$—$H_2O$ reaction. The interaction of boric acid with water aids in obtaining enhanced $CO_2$ flux through the membrane. Moreover, the incorporation of borate ions increases the ionic character of the membrane, reducing the $H_2$ solubility in the membrane. As a consequence, these membranes can also exhibit improved $CO_2/H_2$ selectivity.

Figure 3:
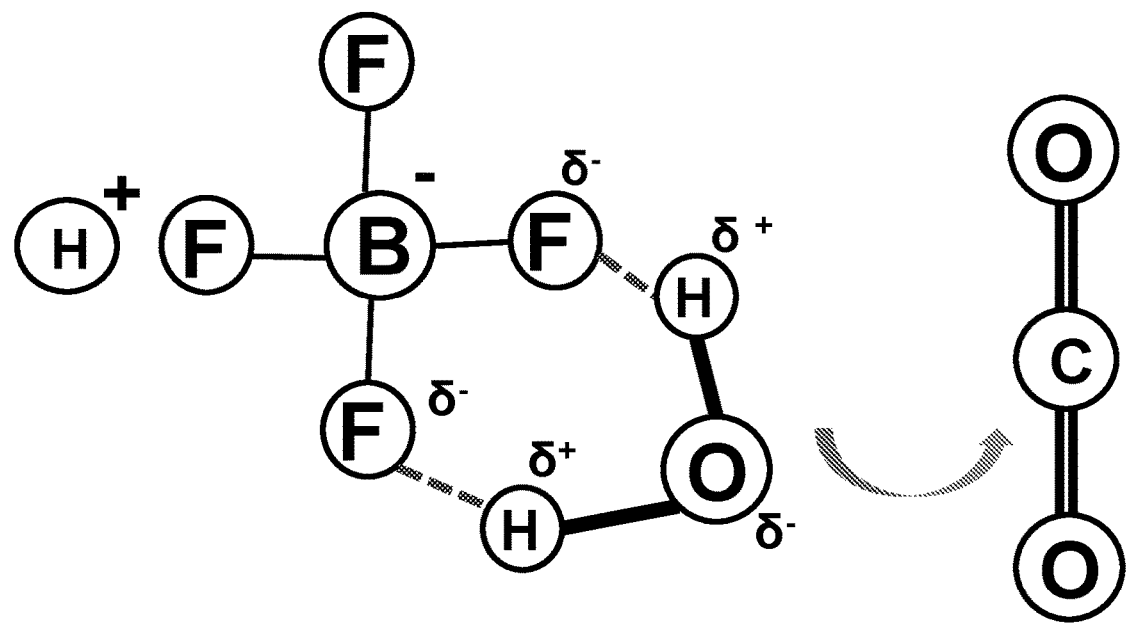
FIG. 3 is a schematic diagram illustrating the interaction between TFBA and a water molecule.

Replacing boric acid or its salts with a tetrafluoroboric acid (TFBA) or a salt of a tetrafluoroborate can further enhance membrane performance. FIG. 3 shows a schematic representation of the interaction of TFBA with a water molecule during the $CO_2$—$H_2O$ reaction. The hydrogen bonding strength between the —F and —H atoms is stronger than that between the —O and —H atoms. Moreover, the TFBA molecule includes four fluoride atoms as hydrogen bonding donors as compared to boric acid (which only includes three oxygen atoms as hydrogen bonding donors). Both of these factors are believed to enhance the basicity of the water molecule further (via hydrogen bonding), thus increasing the rate of $CO_2$—$H_2O$ reaction in presence of TFBA.

Examples 1, 2, 3, and 4 describe the synthesis procedure and illustrate the transport performances of hydroxide- and fluoride-containing membranes with tetrafluoroboric acid and its salts as catalysts. Examples 5, 6, 7 and 8 provide the synthesis procedure and transport performances of the membranes containing salts of tetrafluoroborate and borate as the catalysts. Examples 9-11 illustrate the transport performance using potassium dihydrogenborate (KDHB) as the catalyst.

Examples 12 and 13 show the transport performance using boric acid and tetrafluoroboric acid (TFBA) as the catalysts, respectively. Example 14 demonstrates the stability of the borate-containing membrane comprising TFBA as the catalyst at 120° C. using air as the sweep gas. Example 15 provides the transport performance results of the scale-up borate-containing membrane comprising TFBA as the catalyst at 120° C. using air as the sweep gas. Example 16 describes an optimization of composition of the borate-containing membrane comprising TFBA. Finally, Example 17 exhibits the effect of substrates on the water permeance of borate-containing membrane comprising TFBA.

The transport performance of membranes with various borate-containing compounds, such as sodium tetraborate (STB), tetrafluoroboric acid (TFBA), sodium tetrafluoroborate (STFB), potassium tetrafluoroborate (KTFB), tetramethylquaternaryammonium tetrafluoroborate (TMQ-TFB), tetraethylquaternaryammonium tetrafluoroborate (TEQ-TFB), and tetrabutylquaternaryammonium tetrafluoroborate (TBQ-TFB) are compared in Example 3. These examples demonstrate the catalytic effect of different borate additives for the $CO_2$—$H_2O$ reaction, thereby improving the $CO_2$ permeance through hydroxide- and fluoride-containing membranes. The membranes described herein have many applications including the purification of synthesis gas to produce high-purity $H_2$, $CO_2$ removal from biogas, natural gas, shale gas, and confined space air, and $CO_2$ capture from flue gas in coal- and natural gas-fired power plants for sequestration and enhanced oil recovery.

Materials and Methods

Boric acid, sodium tetraborate, tetrafluoroboric acid, sodium tetrafluoroborate, potassium tetrafluoroborate, tetraethylquaternaryammonium tetrafluoroborate, tetrabutylquaternaryammonium tetrafluoroborate, and tetramethylquaternaryammonium hydroxide purchased commercially and used without further purification unless otherwise specified.

Poly(diallyldimethylquaternaryammonium fluoride) (PDADMQ-F) was prepared from poly(diallyldimethylquaternaryammonium chloride) (PDADMQ-Cl) as described below. Briefly, dried PDADMQ-Cl was dissolved in 30 g of methanol. 1.86 g of potassium fluoride (KF) was then added under vigorous stirring. The ion-exchange reaction of PDADMQ-Cl with KF to form PDADMQ-F proceeded at room temperature for 24 hours. The byproduct salt, KCl, precipitated and was removed from the mixture using centrifugation at 8000 rpm for 5 minutes. Before being used for coating solutions for membrane preparation, the PDADMQ-F solution was air purged to evaporate the solvent and subsequently was re-dissolved in water to obtain a solution of 14.61 wt. % of PDADMQ-F in water.

Membrane Preparation

The first step for membrane synthesis was the preparation of crosslinked polyvinyl alcohol (PVA) solution. PVA S2217 was dissolved in water in a 250-ml glass conical flask to obtain a solution with the desired 13 wt. % of concentration. The aqueous PVA solution was heated to 80° C. with continuous stirring for 2 hours. The aqueous solution of PVA was crosslinked by tetraethylorthosilicate (TEOS) and glutaraldehyde (GA) at a certain molar ratio, such as 40:60 in this case. The TEOS and HCl solution were added under vigorous stirring prior to the addition of KOH solution. The crosslinking reaction was conducted at 80° C. for 80 minutes. Subsequently, the KOH solution (about 30-40% in water) was added dropwise to the PVA-TEOS solution under gentle stirring, and the solution was mixed for 30 minutes. Then, the crosslinking reaction was started by adding glutaraldehyde (GA) solution dropwise under vigorous stirring at 80° C. The reaction was carried out for about 2½ hours after which it was stopped by transferring the reaction flask to a cold stir plate with continued gentle mixing. The crosslinking was targeted at the molar degree of 100%. The total solid content in the crosslinked PVA solution was targeted at 15%, consisting of 12.32% crosslinked PVA and 2.68% KOH. Then, the borate additive solution of 0.8% by weight (unless specified otherwise) in water was prepared separately.

The coating solution for the membrane synthesis was prepared by adding the quaternaryammonium hydroxide solution and the quaternaryammonium fluoride-containing polymer solution dropwise to the calculated amount of the crosslinked PVA solution under stirring in a 50-ml glass beaker. Appropriate amount of water was added to adjust the final concentration of the total solid in the coating solution to avoid instantaneous gelling of the coating solution. Subsequently, the calculated amount of borate additive solution was added dropwise to the hydroxide- and fluoride-containing coating solution. The coating solution was mixed continuously after the addition of the components and then air purged until the desired viscosity was achieved.

A high viscosity of the coating solution was used to minimize penetration of the coating solution into the pores of the substrate. The coating solution was centrifuged at 8000 rpm for 3 minutes to remove air bubbles before it was coated on a flat-sheet nanoporous polysulfone support using a GARDCO adjustable micrometer film applicator (Paul N. Gardner Company, Pompano Beach, Fla.) with a controlled gap setting. The membrane was cured at 120° C. in a convection oven for 6 hours for the complete removal of water and the complete crosslinking reaction of PVA with glutaraldehyde. The thickness of the selective layer was measured by a Mitutoyo electronic indicator (Model 543-252B, Mitutoyo America Corp, Aurora, Ill.) with an accuracy of ±0.5 The thickness of the selective layer was calculated by subtracting the polymer support thickness from the total thickness of the composite membrane.

Transport Measurements

Figure 4:
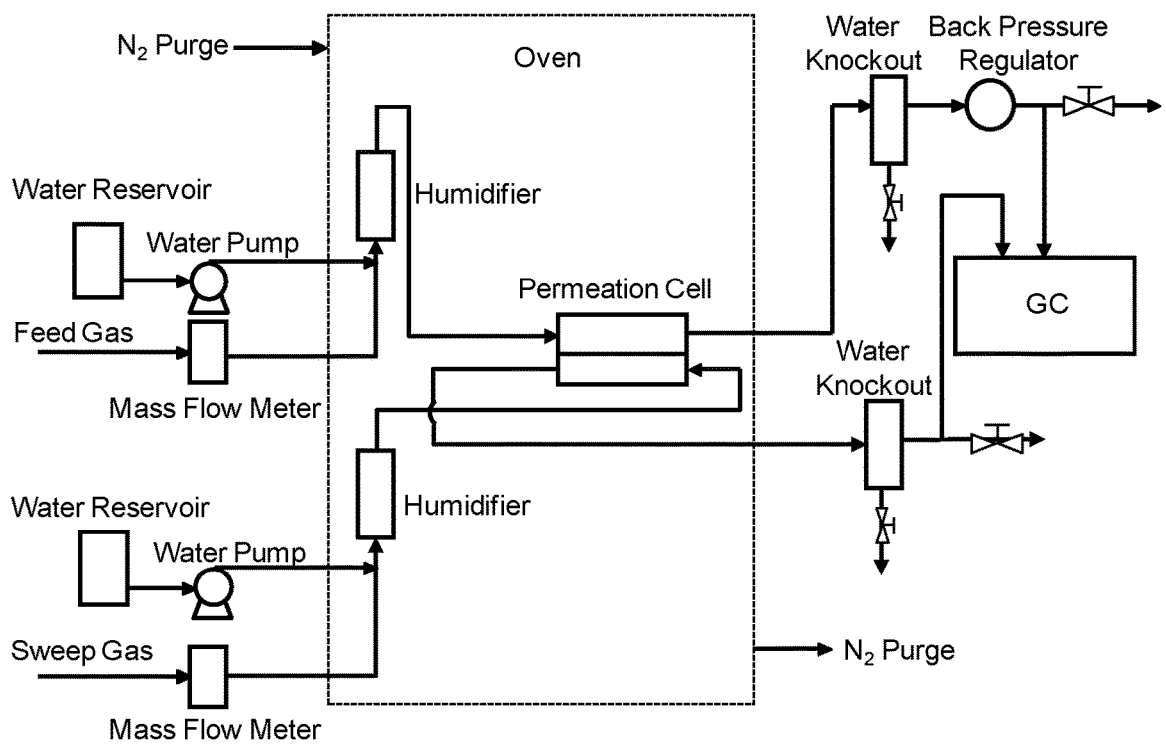
FIG. 4 is a schematic of the gas permeation apparatus used for the gas transport measurements described in the examples herein.

The gas permeation set-up shown schematically in FIG. 4 was used to measure the transport performance of the membranes discussed above. The set-up consisted of mass flow controllers, water pumps and humidifiers to simulate the actual gas compositions in the gas mixture. The membrane to be tested was placed between the upper and lower parts of a rectangular gas permeation cell. The feed and sweep gases entered the cell in a countercurrent configuration at the top and bottom compartments of the permeation cell, respectively. During the testing, the dry feed gas used was 60 cc/min at 1.5 psig, and the dry sweep gas used was 30 cc/min at 1 psig. Both the feed gas and the sweep gas were humidified with water vapor by injecting controlled amounts of water into them to obtain the controlled concentrations of water vapor in them. For composition analysis after the water removal in the knockout vessels, the retentate and permeate streams were directed to the Agilent 6890N (Agilent Tech., Palo Alto, Calif.) gas chromatograph (GC) which is equipped with a stainless steel micropacked column (Supelco, 80/100 mesh, Carboxen 1004, Bellefonte, Calif.) and a thermal conductivity detector (TCD). The membrane surface area of 3.4 $cm^2$ was used for the gas permeation measurements. The membrane performances (permeability $P_i$ and selectivity $\alpha_{ij}$) were evaluated by applying the flux equation using the gas compositions obtained from the GC as follows:

$$P_i = \frac{J_i}{\Delta p_i / \ell} \quad \alpha_{ij} = \frac{y_i / y_j}{x_i / x_j}$$

$$\Delta p_i = \frac{(p_{i,feed\ in} - p_{i,sweepout}) - (p_{i,feed\ out} - p_{i,sweepin})}{\ln(p_{i,feed\ in} - p_{i,sweepout}) - \ln(p_{i,feed\ out} - p_{i,sweepin})}$$

where i denotes the gas component $CO_2$ and j denotes another gas component ($H_2$, $CH_4$, or $N_2$); y and x are the mole fractions of each gas component in the sweep and feed sides of the membrane, respectively; $J_i$ is the steady-state $CO_2$ molar flux across the selective layer; l is the selective layer thickness; and $\Delta p_i$ is the partial pressure difference between the feed and sweep sides (driving force) for the permeation process, which is determined using the logarithmic mean method.

The common unit of the permeability ($P_i$) is Barrer, which is equal to $10^{-10}$ cm$^3$ (STP) cm/(cm$^2$ s cmHg)=3.35×10$^{-16}$ mol m/(m$^2$ s Pa)). The ratio of permeability to the selective layer thickness ($P_i$/l) is referred as the permeance and its common unit is the gas permeation unit (GPU), which is equal to $10^{-6}$ cm$^3$ (STP)/(cm$^2$ s cmHg).

Example 1: Borate-Containing Membranes—Effect of Tetrafluoroboric Acid as a Catalyst Tetrafluoroboric acid (TFBA) was investigated as a catalyst for the $CO_2$—$H_2O$ reaction in the hydroxide- and fluoride-containing membranes. A mobile carrier, tetramethylquaternaryammonium hydroxide (TMAOH), was blended with a fixed site carrier, fluoride-containing polymer, polydiallyldimethylquaternaryammonium fluoride (PDADMQ-F), to form a solution containing a mixture of these two carriers, i.e., TMAOH and PDADMQ-F. The carrier solution was blended with a 14.8 wt. % crosslinked PVA-POS (XL-PVA-POS) solution to obtain a coating solution with a total solids concentration of 16 wt. %. Additional water was added to the coating solution to avoid instantaneous gel formation. Separately, a 1% by weight solution of TFBA was prepared. The calculated amount of TFBA solution was added dropwise to the coating solution. The viscosity of the coating solution increased rapidly with time with air-purging, and the mixing of the coating solution was carried out until it attained desirable viscosity. Different coating solutions with total solids concentrations (8-12% by weight) were prepared for different contents of TFBA (0.4-2% by weight in the total solids).

The membranes were coated on the porous polysulfone substrate using the coating knife with an average dry selective layer thickness of 15 µm. The gas permeation measurements were performed at 120° C. with 54% steam on the feed side. The feed gas with a certified composition of 59.5% $CO_2$, 26.5% $H_2$, and 14% CO (on dry basis) was used and humidified with a water vapor content of 54% for the transport measurements. Air with 30% steam content was used as the sweep gas. The membrane composition and transport performances are shown in Table 1. As shown in Table 1, the transport performance of the membranes with TFBA as a catalyst, i.e., M-2 until M-5, exhibited significantly higher $CO_2$ permeance along with a higher or comparable $CO_2/H_2$ selectivity than the membrane without this catalyst, M-1. The $CO_2$ permeance increased as the catalyst content increased. At the catalyst content of 2 wt. %, the membrane M-5 showed a high $CO_2$ permeance of 91 GPU and an impressive $CO_2/H_2$ selectivity of 193. This example has demonstrated the significant effect of tetrafluoroboric acid (TFBA) on $CO_2$ permeance improvement through catalyzing the $CO_2$—$H_2O$ reaction in the membrane.

TABLE 1

The performances of tetrafluoroboric acid membranes: effect of catalyst.

| Membrane | TMAOH (wt. %) | PDADMQ-F (wt. %) | XL-PVA-POS (wt. %) | TFBA (wt. %) | $CO_2$ Permeance (GPU) | $CO_2/H_2$ Selectivity |
|---|---|---|---|---|---|---|
| M-1 | 11 | 54 | 35 | 0 | 52 | 161 |
| M-2 | 11 | 54 | 35 | 0.4 | 73 | 174 |
| M-3 | 10.9 | 53.5 | 34.7 | 0.8 | 77 | 205 |
| M-4 | 10.9 | 52.9 | 34.3 | 1.6 | 87 | 163 |
| M-5 | 10.8 | 52.9 | 34.3 | 2 | 91 | 193 |

Figure 5:
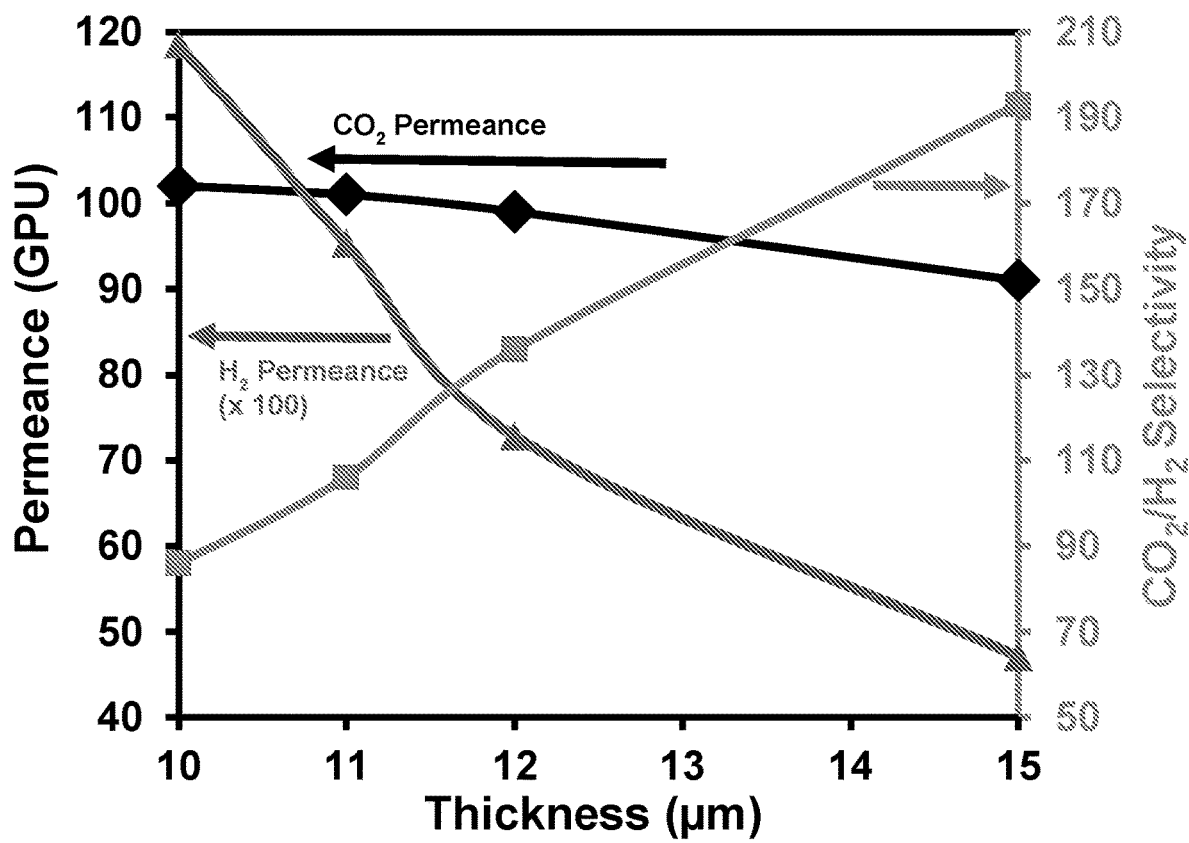
FIG. 5 is a plot illustrating the effect of selective layer thickness on the $CO_2$ permeance (diamond trace), $H_2$ permeance (triangle trace), and $CO_2/H_2$ selectivity (square trace) of a tetrafluoroboric acid-containing membrane containing 10.8% TMAOH, 52.9% PDADMQ-F, 34.3% crosslinked PVA-POS, and 2% TFBA content tested at 120° C. with air as the sweep gas.

Example 2: Tetrafluoroboric Acid-Containing Membranes—Effect of Membrane Thickness The effect of selective layer thickness was investigated at 120° C. for the tetrafluoroboric acid-catalyzed hydroxide- and fluoride-containing membranes. A membrane containing 10.8% TMAOH, 52.9% PDADMQ-F, and 34.3% XL-PVA-POS (as in M-5 of Table 1 in Example 1) was used for the investigation. The same transport measurement described in Example 1 was used. Table 2 and FIG. 5 show the effect of thickness on $CO_2$ permeance and $CO_2/H_2$ selectivity. With decreasing the thickness, the $CO_2$ permeance increased, but the $CO_2/H_2$ selectivity reduced.

TABLE 2

Performances of the tetrafluoroboric acid-containing membrane - effect of thickness.

| Membrane | Thickness (µm) | $CO_2$ Permeance (GPU) | $CO_2/H_2$ Selectivity |
|---|---|---|---|
| M-1 | 15 | 91 | 193 |
| M-2 | 12 | 99 | 136 |
| M-3 | 11 | 101 | 106 |
| M-4 | 10 | 102 | 86 |

Example 3: Borate-Containing Membranes—Effect of Different Catalysts

Hydroxide- and fluoride-containing membranes with different borate additives were investigated for transport performances. The catalytic activity of sodium tetraborate (STB), tetrafluoroboric acid (TFBA), sodium tetrafluoroborate (STFB), potassium tetrafluoroborate (KTFB), tetramethylquaternaryammonium tetrafluoroborate (TMQ-TFB), tetraethylquaternaryammonium tetrafluoroborate (TEQ-TFB), and tetrabutylquaternaryammonium tetrafluoroborate (TBQ-TFB), were compared. The membranes were synthesized in a similar manner as described in the Example 1. The gas permeation testing unit, feed gas, and sweep gas were identical to the previous examples. The borate additive content was maintained at 2% by weight for the comparison. The thickness of the selective layer was maintained at 15 µm. The membrane compositions and transport performances are shown in Table 3.

A higher $CO_2$ permeance was observed in membranes that include a tetrafluoroborate salt with a quaternaryammonium cation. However, the $CO_2/H_2$ selectivity was shown to be reduced as compared to the membranes with tetrafluoroboric acid and other salts of tetrafluoroborate as the catalysts. Sodium and potassium salts of tetrafluoroborate demonstrated $CO_2$ permeance higher than sodium tetraborate-containing membranes but lower than tetrafluoroboric acid-containing membranes. Moreover, the $CO_2/H_2$ selectivities of these membranes seemed similar. Thus, hydroxide- and fluoride-containing membranes with tetrafluoroboric acid exhibit desirable $CO_2$ permeance and $CO_2/H_2$ selectivity.

TABLE 3

The performances of borate-containing membranes: effect of different catalysts.

| Membrane | TMAOH (wt. %) | PDADMQ-F (wt. %) | XL-PVA-POS (wt. %) | Borate Catalyst (wt. %) | $CO_2$ Permeance (GPU) | $CO_2/H_2$ Selectivity |
|---|---|---|---|---|---|---|
| M-1 | 10.8 | 52.9 | 34.3 | 2% STB | 79 | 185 |
| M-2 | 10.8 | 52.9 | 34.3 | 2% TFBA | 91 | 193 |
| M-3 | 10.8 | 52.9 | 34.3 | 2% STFB | 85 | 190 |
| M-4 | 10.8 | 52.9 | 34.3 | 2% KTFB | 83 | 186 |
| M-5 | 10.8 | 52.9 | 34.3 | 2% TMQ-TFB | 96 | 163 |
| M-6 | 10.8 | 52.9 | 34.3 | 2% TEQ-TFB | 95 | 94 |
| M-7 | 10.8 | 52.9 | 34.3 | 2% TBQ-TFB | 90 | 96 |

Example 4: Borate-Containing Membranes—Effect of Tetramethylquaternaryammonium Tetrafluoroborate (TMQ-TFB) as a Catalyst Tetramethylquaternaryammonium tetrafluoroborate (TMQ-TFB) was investigated as a catalyst for the $CO_2$–$H_2O$ reaction in the hydroxide- and fluoride-containing membranes. The mobile carrier (TMAOH) was blended with the fixed site carrier, fluoride-containing polymer PDADMQ-F, to form a solution containing a mixture of these two carriers, i.e., TMAOH and PDADMQ-F. The carrier solution was blended with a 14.8 wt. % crosslinked PVA-POS (XL-PVA-POS) solution to obtain a coating solution with a total solids concentration of 16 wt. %. Additional water was added to the coating solution to avoid instantaneous gel formation. A 1% by weight solution of TMQ-TFB was prepared, and a calculated amount of the TMQ-TFB solution was added dropwise to the coating solution. The membranes were coated on the porous polysulfone substrate using the knife coating procedure discussed in the previous examples. The dry film thickness was maintained at 15 µm. The gas permeation measurements were performed in the same way as described in the previous examples. The transport performances and the membrane compositions are listed in Table 4. This example has highlighted the significant enhancement in $CO_2$ transport via the catalytic effect of TMQ-TFB.

TABLE 4

The transport performances and membrane compositions for TMQ-TFB-containing membranes.

| Sample | Composition - wt. % (TMAOH:PDADMQ-F:XL-PVA-POS) | Borate Catalyst (wt. %) | $CO_2$ Permeance (GPU) | $CO_2/H_2$ Selectivity |
|---|---|---|---|---|
| M-1 | 11:59:30 | 2% TMQ-TFB | 98 | 151 |
| M-2 | 10:60:30 | 2% TMQ-TFB | 105 | 120 |
| M-3 | 9:61:30 | 2% TMQ-TFB | 110 | 92 |

Example 5: Borate-Containing Membranes—Effect of TMQ-TFB and TFBA as Dual Catalysts The combination of tetramethylquaternaryammonium tetrafluoroborate (TMQ-TFB) and tetrafluoroboric acid (TFBA) as a catalyst for the $CO_2$—$H_2O$ reaction in hydroxide- and fluoride-containing membranes was investigated. The coating solution was prepared in a similar manner as discussed in the previous examples. The calculated amounts of TMQ-TFB solution and TFBA solution were added dropwise to the coating solution. The viscosity of the coating solution increased rapidly with time with air-purging, and the mixing of the coating solution was carried out until it attained desirable viscosity. The membranes were coated on the porous polysulfone substrate using the knife coating procedure, and the dry film thickness was maintained at 15 μm. The gas permeation measurements were performed in the same way as described in the previous examples. The transport performances and the membrane compositions are listed in Table 5. The transport performances were very good, showing the significant effectiveness of the dual catalysts.

Example 7: Borate-Containing Membranes—Effect of Polydiallyldimethylquaternaryammonium Tetrafluoroborate as a Catalyst The previous examples demonstrated the catalytic effect of tetrafluoroboric acid and the salts of tetrafluoroborate for the $CO_2$ hydration reaction to facilitate the $CO_2$ transport through the membranes. To extend the scope of investigation, polydiallyldimethylquaternaryammonium tetrafluoroborate (PDADMQ-TFB) was examined for the catalytic effect. The synthesis procedure of PDADMQ-TFB was similar to the procedure of PDADMQ-F. Briefly, a commercial sample of PDADMQ-Cl was ion-exchanged with potassium salt of tetrafluoroborate for the synthesis of PDADMQ-TFB. The membrane containing PDADMQ-TFB was prepared in the same procedure described in previous examples, in which firstly, the mobile carrier solution

TABLE 5

The transport performances of the membranes containing dual TFBA and TMQ-TFB catalysts.

| Sample | Composition - wt. % (TMAOH:PDADMQ-F:XL-PVA-POS) | Borate Catalyst (wt. %) | $CO_2$ Permeance (GPU) | $CO_2/H_2$ Selectivity |
|---|---|---|---|---|
| M-1 | 10.8:52.9:34.3 | 2% TFBA | 91 | 193 |
| M-2 | 10.8:52.9:34.3 | 2% TMQ-TFB | 96 | 163 |
| M-3 | 10.8:52.9:34.3 | 2% (TFBA + TMQ-TFB) | 93 | 175 |
| M-4 | 10.8:52.9:34.3 | 4% (TFBA + TMQ-TFB) | 90 | 160 |

Example 6: TMQ-TFB-Containing Membrane—Effect of Membrane Thickness

Figure 6:
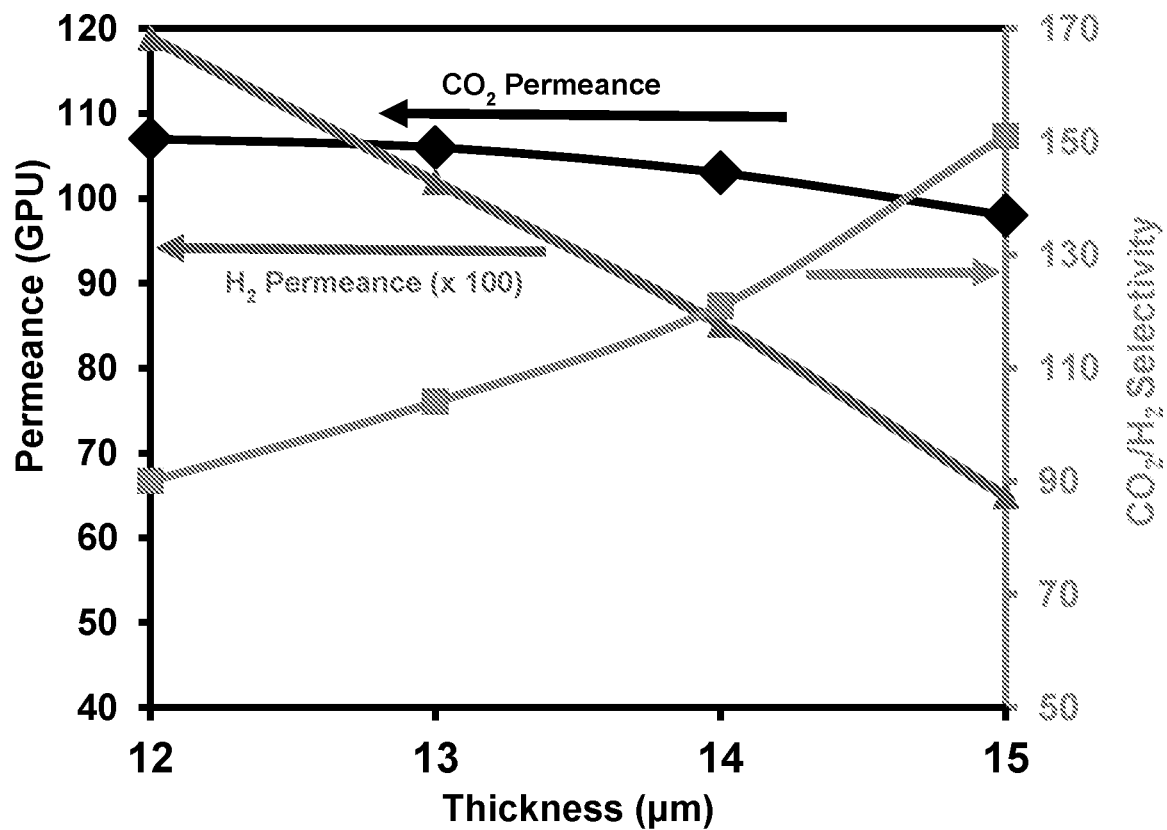
FIG. 6 is a plot illustrating the effect of selective layer thickness on the $CO_2$ permeance (diamond trace), $H_2$ permeance (triangle trace), and $CO_2/H_2$ selectivity (square trace) of a TMQ-TFB-containing membrane tested at 120° C. with air as the sweep gas.

The effect of the selective layer thickness was investigated at 120° C. for the TMQ-TFB-containing (2% by weight) membrane with 10.8% TMAOH, 52.9% PDADMQ-F, and 34.3% XL-PVA-POS. A dry feed mixture with a certified composition of 59.5% $CO_2$, 26.5% $H_2$, and 14% CO was used and incorporated with 54% steam content on the feed side. The steam content on the sweep side was controlled at 30% with air as the dry sweep gas. Table 6 and FIG. 6 show the effect of thickness on the gas transport performance in terms of $CO_2$ permeance and $CO_2/H_2$ selectivity. As the membrane thickness reduced, the $CO_2$ permeance increased, but the $CO_2/H_2$ selectivity decreased pronouncedly. However, all of the membranes with different thicknesses investigated showed very good performances with a $CO_2$ permeance of at least 98 GPU and a $CO_2/H_2$ selectivity of at least 90.

(TMAOH) was mixed with crosslinked PVA-POS solution. To the TMAOH-crosslinked PVA-POS solution, the calculated amount of PDADMQ-TFB was added dropwise. The membrane was coated using the knife coating technique discussed before and tested for transport performances using the feed and sweep gas compositions illustrated in the previous examples. The result of the PDADMQ-TFB-containing membrane is shown in Table 7.

As shown in Table 7, an unexpectedly low $CO_2$ permeance of 8 GPU and $CO_2/H_2$ selectivity of 10 was obtained using PDADMQ-TFB as the catalyst. Although small molecules (salts of tetrafluoroborate) including a tetrafluoroborate anion demonstrated a strong catalytic effect, no catalytic effect was evidenced when PDADMQ-TFB containing the same anion was used.

TABLE 6

Effect of thickness for the TMQ-TFB membrane.

| Sample | Composition - wt. % (TMAOH:PDADMQ-F:XL-PVA-POS) | Borate Catalyst (wt. %) | Thickness (μm) | $CO_2$ Permeance (GPU) | $CO_2/H_2$ Selectivity |
|---|---|---|---|---|---|
| M-1 | 10.8:52.9:34.3 | 2% TMQ-TFB | 15 | 98 | 151 |
| M-2 | 10.8:52.9:34.3 | 2% TMQ-TFB | 14 | 103 | 121 |
| M-3 | 10.8:52.9:34.3 | 2% TMQ-TFB | 13 | 106 | 104 |
| M-4 | 10.8:52.9:34.3 | 2% TMQ- TFB | 12 | 107 | 90 |

TABLE 7

The performance of PDADMQ-TFB-containing membrane.

| Membrane | TMAOH (wt. %) | PDADMQ-TFB (wt. %) | XL-PVA-POS (wt. %) | $CO_2$ Permeance (GPU) | $CO_2/H_2$ Selectivity |
|---|---|---|---|---|---|
| M-1 | 11 | 54 | 35 | 8 | 10 |

Example 8: Borate-Containing Membranes—Effect of Sodium Tetraborate as a Catalyst Sodium tetraborate (STB) was investigated as a catalyst for the $CO_2$—$H_2O$ reaction that facilitates the $CO_2$ transport through the hydroxide- and fluoride-containing membrane at 120° C. The mobile carrier (TMAOH) was blended with the fixed site carrier, fluoride-containing polymer PDADMQ-F, to form a solution containing a mixture of these two carriers, i.e., TMAOH and PDADMQ-F. The carrier solution was blended with a 14.8 wt. % crosslinked PVA-POS (XL-PVA-POS) solution to obtain a coating solution with a total solids concentration of 16 wt. %. Additional water was added to the coating solution to avoid instantaneous gel formation. A 0.8% by weight solution of STB was prepared. The calculated amount of STB solution was added dropwise to the coating solution. The viscosity of the coating solution increased rapidly with time with air-purging, and the mixing of the coating solution was carried out until it attained desirable viscosity. Different coating solutions with total solids concentrations (9-14% by weight) were prepared for different contents of STB (0.4-2% by weight in total solids). The membranes were coated using the same knife coating technique described in the previous examples. The same gas permeation set-up and feed gas and sweep gas compositions were used as described in the previous examples for transport measurements. The average selective layer of the membrane was kept constant at 15 μm.

The membrane compositions and transport performances are shown in Table 8. As shown in Table 8, the transport performances of the membranes with STB as the catalyst, i.e., M-2 until M-4, exhibited a higher $CO_2$ permeance (up to 79 GPU) and $CO_2/H_2$ selectivity (up to 195) as compared to the membrane with no catalyst. The membrane performance, especially the $CO_2$ permeance, increased as the catalyst amount in the membrane increased. This suggests that STB can be used as a catalyst for enhancing $CO_2$ transport.

Example 9: Borate-Containing Membranes—Effect of Potassium Dihydrogenborate as a Catalyst Potassium dihydrogenborate (KDHB) was investigated as a catalyst for the $CO_2$—$H_2O$ reaction that aids in $CO_2$ transport through the membrane at 120° C. The coating solution procedure was maintained similar to the procedure discussed in the previous examples. A 0.8% by weight solution of potassium dihydrogenborate was prepared. The calculated amount of KDHB solution was added dropwise to the coating solution. The viscosity of the coating solution increased rapidly with air-purging, and the mixing of the coating solution was carried out until it attained desirable viscosity. Different coating solutions with total solids concentrations (10-15% by weight) were used for different amounts of KDHB (0.2-0.8% by weight in the total solids). The membranes were coated on the porous polysulfone substrate using the knife coating technique discussed in the previous examples. The average dry selective layer thickness was maintained at 15 μm. The gas permeation measurements were performed in the same way as described in previous examples.

The membrane compositions and transport performances are shown in Table 9. As shown in Table 9, the transport performances of the membranes with KDHB as the catalyst, i.e., M-2 till M-4, exhibited a higher $CO_2$ permeance (up to 65 GPU) and $CO_2/H_2$ selectivity (up to 189) than the membrane without the catalyst. Both $CO_2$ permeance and $CO_2/H_2$ selectivity increased as the catalyst amount in the membrane increased. This suggests that KDBH can be used as a catalyst for $CO_2$ transport.

TABLE 8

The performances of sodium tetraborate-containing membranes: effect of catalyst.

| Membrane | TMAOH (wt. %) | PDADMQ-F (wt. %) | XL-PVA-POS (wt. %) | STB (wt. %) | $CO_2$ Permeance (GPU) | $CO_2/H_2$ Selectivity |
|---|---|---|---|---|---|---|
| M-1 | 11 | 54 | 35 | 0 | 52 | 161 |
| M-2 | 11 | 54 | 35 | 0.4 | 66 | 187 |
| M-3 | 10.9 | 53.5 | 34.7 | 0.8 | 76 | 195 |
| M-4 | 10.9 | 52.9 | 34.3 | 2 | 79 | 185 |

TABLE 9

The performances of potassium dihydrogenborate-containing membranes: effect of catalyst.

| Membrane | TMAOH (wt. %) | PDADMQ-F (wt. %) | XL-PVA-POS (wt. %) | KDHB (wt. %) | $CO_2$ Permeance (GPU) | $CO_2/H_2$ Selectivity |
|---|---|---|---|---|---|---|
| M-1 | 11 | 54 | 35 | 0 | 52 | 161 |
| M-2 | 11 | 54 | 35 | 0.2 | 58 | 182 |
| M-3 | 11 | 54 | 35 | 0.4 | 62 | 188 |
| M-4 | 11 | 54 | 35 | 0.8 | 65 | 189 |

Example 10: Potassium Dihydrogenborate-Containing Membranes—Effect of the Crosslinking of XL-PVA-POS Membrane Matrix The effect of the crosslinking of XL-PVA-POS membrane matrix by using KOH as the catalyst was investigated at 120° C. The membranes with 11% TMAOH, 54% PDADMQ-F, and 35% XL-PVA-POS containing 0.8% KDHB (as in M-4 of Table 9 in Example 9) were used for the investigation. The membranes were prepared and tested in the same way as described in the previous examples.

Figure 7:
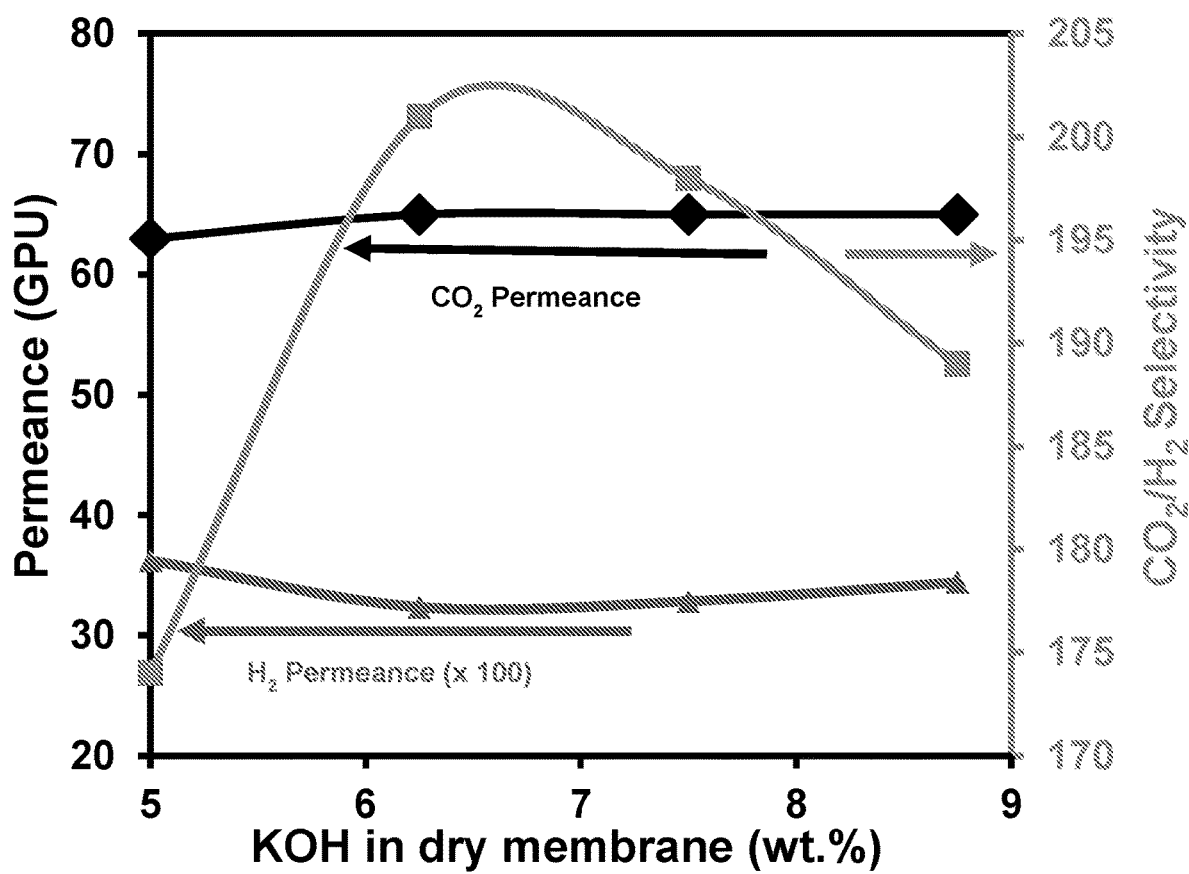
FIG. 7 is a plot illustrating the effect of the crosslinking of an XL-PVA-POS membrane matrix with KOH as the catalyst on the $CO_2$ permeance (diamond trace), $H_2$ permeance (triangle trace), and $CO_2/H_2$ selectivity (square trace) of a potassium dihydrogenborate-containing membrane with 11% TMAOH, 54% PDADMQ-F, 35% crosslinked PVA-POS, and 0.8% KDHB content tested at 120° C. with air as the sweep gas.

Table 10 and FIG. 7 show the effect of the crosslinking of XL-PVA-POS membrane matrix with KOH as the catalyst on the gas transport performance in terms of $CO_2$ permeance and $CO_2/H_2$ selectivity. As the KOH content in the dry membrane composition reduced, the $CO_2/H_2$ selectivity reached the optimum value at 6.25 wt. % of KOH. Further reduction of KOH content resulted in an increased of the $H_2$ permeance due to the looser membrane matrix caused by insufficient crosslinking of the XL-PVA-POS membrane matrix. Furthermore, a slight decrease of the $CO_2$ permeance was also observed as KOH is also a well-known $CO_2$ carrier via the facilitated transport mechanism. This suggests that KOH concentration can be varied during membrane preparation to influence XL-PVA-POS crosslinking (and by extension to improve $CO_2/H_2$ selectivity).

TABLE 10

The performances of potassium dihydrogenborate-containing membranes (0.8% by weight KDHB): effect of the crosslinking of XL-PVA-POS membrane matrix.

| Membrane | TMAOH (wt. %) | PDADMQ-F (wt. %) | XL-PVA-POS (wt. %) | KOH (wt. %) | $CO_2$ Permeance (GPU) | $CO_2/H_2$ Selectivity |
|---|---|---|---|---|---|---|
| M-1 | 11 | 54 | 35 | 8.75 | 65 | 189 |
| M-2 | 11 | 54 | 35 | 7.5 | 65 | 198 |
| M-3 | 11 | 54 | 35 | 6.25 | 65 | 201 |
| M-4 | 11 | 54 | 35 | 5 | 63 | 174 |

Figure 8:
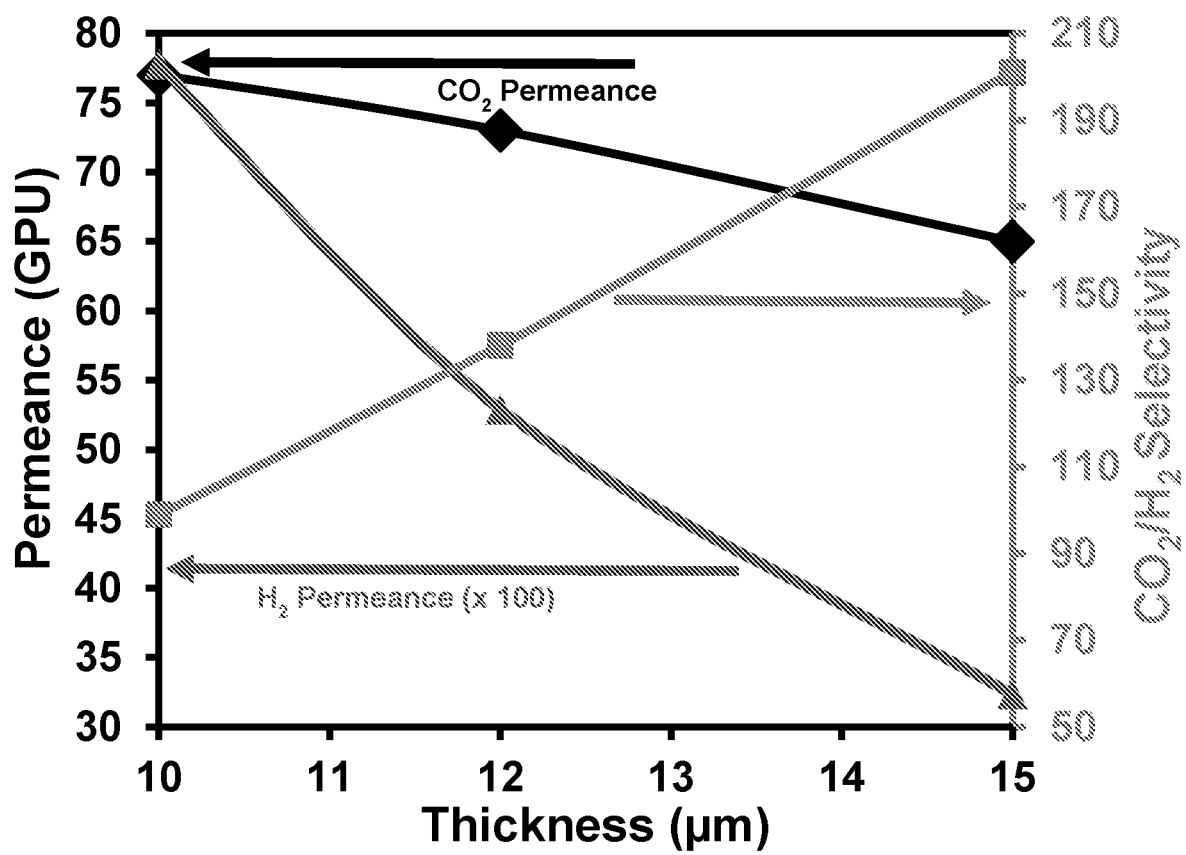
FIG. 8 is a plot illustrating the effect of selective layer thickness on the $CO_2$ permeance (diamond trace), $H_2$ permeance (triangle trace), and $CO_2/H_2$ selectivity (square trace) of a potassium dihydrogenborate-containing membrane (0.8% by weight KDHB in total solids) containing 11% TMAOH, 54% PDADMQ-F, and 35% crosslinked PVA-POS tested at 120° C. with air as the sweep gas.

Example 11: Potassium Dihydrogenborate-Containing Membranes—Effect of Membrane Thickness The effect of selective layer thickness was investigated at 120° C. for the KDHB-containing membrane (0.8% by weight KDHB in total solids) with 11% TMAOH, 54% PDADMQ-F, and 35% XL-PVA-POS (as in M-3 of Table 10 in Example 10). The membrane preparation and transport measurement were the same as those described in the previous examples. Table 11 and FIG. 8 show the effect of membrane thickness on the gas transport performance in terms of $CO_2$ permeance and $CO_2/H_2$ selectivity. As the membrane thickness reduced, the $CO_2$ permeance increased whereas the $CO_2/H_2$ selectivity decreased.

TABLE 11

The effect of membrane thickness on performance for the potassium dihydrogenborate-containing membrane.

| Membrane | Thickness (μm) | $CO_2$ Permeance (GPU) | $CO_2/H_2$ Selectivity |
|---|---|---|---|
| M-1 | 15 | 65 | 201 |
| M-2 | 12 | 73 | 138 |
| M-3 | 10 | 77 | 99 |

Example 12: Borate-Containing Membranes—Effect of Boric Acid as a Catalyst

Boric acid (BA) was investigated as a catalyst for the $CO_2$—$H_2O$ reaction to enhance the $CO_2$ transport through the hydroxide- and fluoride-containing membranes at 120° C. The coating solution synthesis procedure was kept similar to the previous examples. Boric acid was dissolved in water to form a 0.8% by weight solution. The calculated amount of boric acid solution was added dropwise to the coating solution. The viscosity of the coating solution rapidly increased with air-purging, and the mixing of the coating solution was carried out until it attained desirable viscosity. The membranes were coated on the porous polysulfone substrate using the coating knife with an average dry selective layer thickness of 15 μm. The gas permeation measurements were performed at 120° C. with the feed and the sweep gas compositions described in the previous examples.

The membrane compositions and transport performances are shown in Table 12. The transport performances of the membranes with boric acid (BA) as the catalyst, i.e., M-2 till M-4, exhibited a higher $CO_2$ permeance (up to 65 GPU) and a higher $CO_2/H_2$ selectivity (up to 171) as compared to the membrane with no catalyst. Both $CO_2$ permeance and $CO_2/H_2$ selectivity increased as the BA amount increased. This suggests that BA can be used as a catalyst for the $CO_2$—$H_2O$ reaction to facilitate the $CO_2$ transport through the membrane.

TABLE 12

The performances of boric acid-containing membranes: effect of catalyst.

| Membrane | TMAOH (wt. %) | PDADMQ-F (wt. %) | XL-PVA-POS (wt. %) | BA (wt. %) | $CO_2$ Permeance (GPU) | $CO_2/H_2$ Selectivity |
|---|---|---|---|---|---|---|
| M-1 | 11 | 54 | 35 | 0 | 52 | 161 |
| M-2 | 11 | 54 | 35 | 0.4 | 59 | 163 |
| M-3 | 11 | 54 | 35 | 0.8 | 64 | 169 |
| M-4 | 11 | 54 | 35 | 1 | 65 | 171 |

Example 13: Borate-Containing Membranes—Membrane Composition Optimization Using Tetrafluoroboric Acid as the Catalyst The effect of tetrafluoroboric acid (TFBA) as a catalyst was investigated further by optimizing the total solids composition for the hydroxide- and fluoride-containing membranes. The mobile carrier (TMAOH) was blended with the fixed site carrier, fluoride-containing polymer PDADMQ-F, to form a solution containing a mixture of these two carriers, i.e., TMAOH and PDADMQ-F. The carrier solution was blended with a 14.8 wt. % crosslinked PVA-POS (XL-PVA-POS) solution to obtain a coating solution with a total solids concentration of 16 wt. %. Additional water was added to the coating solution to avoid instantaneous gel formation. A 1% by weight solution of TFBA was prepared, and a calculated amount of the TFBA solution was added dropwise to the coating solution. The membranes (15 μm dry film thicknesses) were coated on top of the porous polysulfone substrates using the knife coating procedure discussed in the previous examples. The gas permeation measurements were performed in the same manner as described in the previous examples.

The membrane composition was optimized by systematically reducing the mobile carrier (TMAOH) content. The transport performances and the membrane compositions are listed in Table 13. This example highlights the effect of mobile carrier content on $CO_2$ permeance. Typically, a higher mobile carrier content leads to higher $CO_2$ permeance. However, for this system, the weight ratio of TMAOH to PDADMQ-F content appeared to be the governing factor for optimum moisture retention. And thus, the $CO_2$ permeance was observed to increase as the mobile carrier content was dropped from 9.8 wt. % to 7.8 wt. %. This trend was similar to the trend observed when TMQ-TFB was used as the catalyst in Example 4 and Table 4.

TABLE 13

The transport performances and membrane compositions for TFBA-containing membranes.

| Sample | Composition (wt. %) TMAOH:PDADMQ-F:XL-PVA-POS | Borate Catalyst (wt. %) | $CO_2$ Permeance (GPU) | $CO_2/H_2$ Selectivity |
|---|---|---|---|---|
| M-1 | 9.8:53.9:34.3 | 2% TFBA | 97 | 121 |
| M-2 | 8.8:54.9:34.3 | 2% TFBA | 99 | 110 |
| M-3 | 7.8:55.9:34.3 | 2% TFBA | 101 | 105 |

Figure 9:
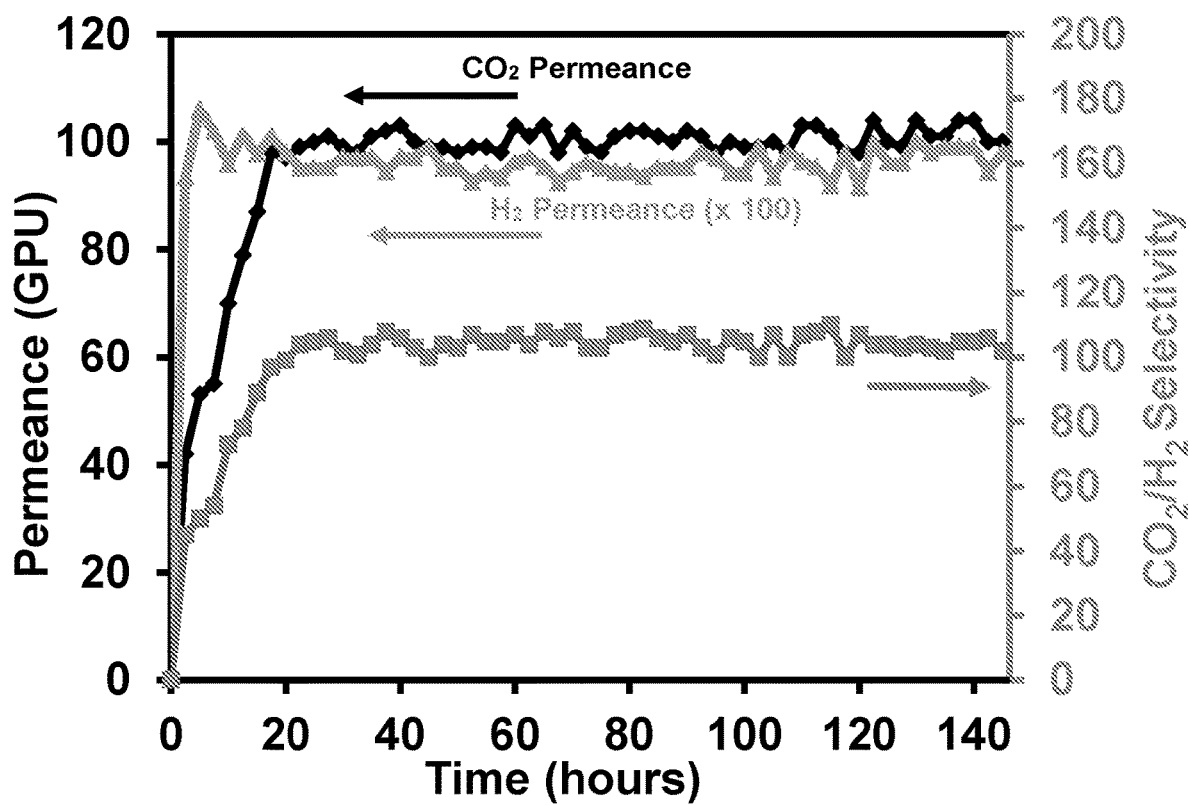
FIG. 9 is a stability plot of membrane M-1 at 120° C. with air sweep (54% steam in feed and 30% steam in sweep). The plot includes the $H_2$ permeance (×100, triangle trace), $CO_2$ permeance (diamond trace), and $CO_2/H_2$ selectivity (square trace) over time (in hours) measured for the membrane.

Example 14: Stability of Borate-Containing Membrane Tested at 120° C. Using Air as the Sweep Gas The stability of borate-containing membrane comprising TFBA as a catalyst was investigated at 120° C. using air as the sweep gas. The membrane (15 μm thickness) with total solids composition same as M-3 in Table 13 of Example 13 was used for the measurement of transport stability. The gas transport measurements were performed in the same way as described in the previous examples. The performance and stability are detailed in Table 14 and FIG. 9, respectively. As seen in FIG. 9, there appeared to be a very small drop in the $CO_2/H_2$ selectivity, from 105 to 104 that could be within an experimental error, for the 145-hour test. However, the overall $CO_2$ permeance was very stable without any changes during the 145 hours of the test.

TABLE 14

The transport performances and membrane composition for TFBA-containing membrane.

| Sample | Composition (wt. %) TMAOH:PDADMQ-F:XL-PVA-POS | Borate Catalyst (wt. %) | $CO_2$ Permeance (GPU) | $CO_2/H_2$ Selectivity | Testing Time (hours) |
|---|---|---|---|---|---|
| M-1 | 7.8:55.9:34.3 | 2% TFBA | 101 | 105 → 104 | 145 |

Figure 10:
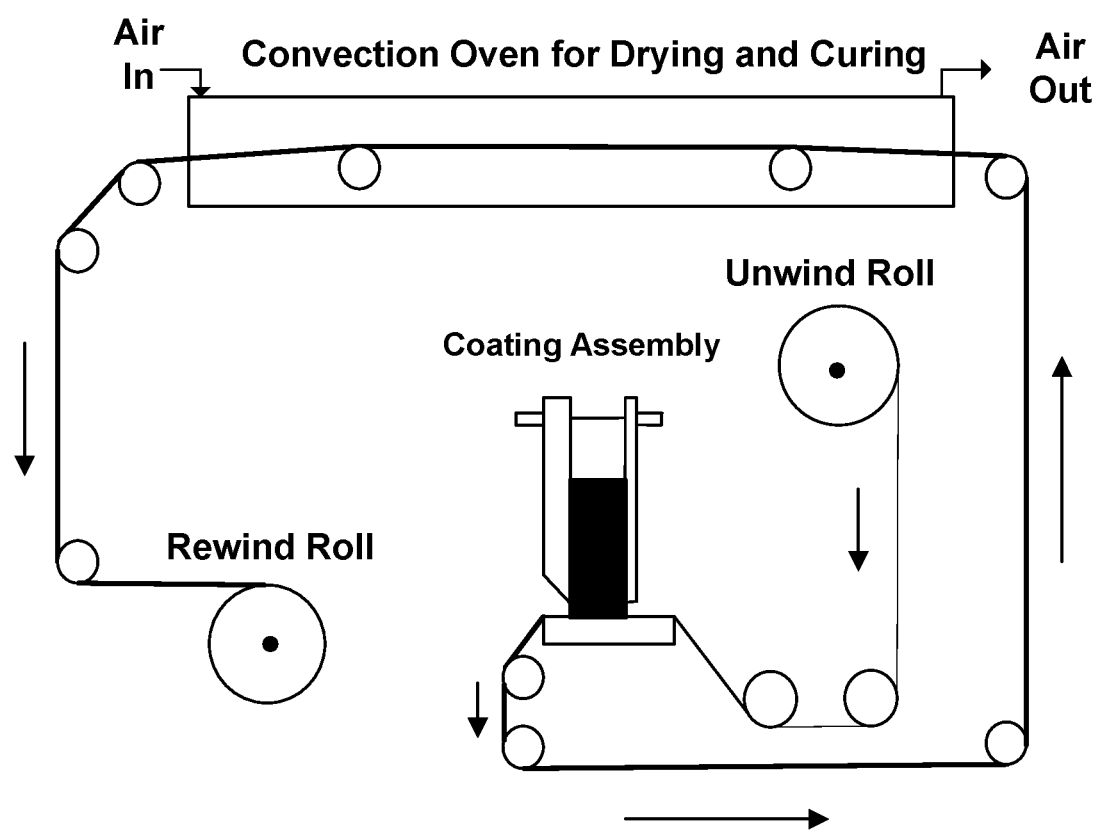
FIG. 10 is a schematic representation of a pilot-scale thin-film-coating assembly suitable for the fabrication of the polymer membranes described herein.
Figure 11:
FIG. 11 is a picture of a pilot-scale machine consisting of a pilot-scale thin-film-coating assembly suitable for the fabrication of the polymer membranes described herein.

Example 15: Scale-Up Fabrication of Borate-Containing Membrane Tested at 120° C. Using Air as the Sweep Gas The scale-up fabrication of the borate-containing membrane was demonstrated by using the thin-film casting (TFC) assembly of the continuous membrane fabrication machine. The schematic representation of the thin-film casting assembly used for the pilot-scale membrane fabrication is shown in FIG. 10. The pilot-scale membrane fabrication machine installed at The Ohio State University is shown in FIG. 11.

The coating solution for the borate-containing membrane composition comprising 6.9% TMOAH, 56.8% PDADMQ-F, 34.3% XL-PVA-POS, and 2% TFBA (% by weight) was prepared in a similar manner described in the previous examples. A total of more than 300 feet long and 14 inches wide borate-containing membranes were successfully fabricated using the pilot-scale membrane fabrication machine. The transport performance of a small representative sample (3.4 cm$^2$) taken from the scale-up fabricated membrane was measured by using the same gas permeation measurement described in the previous examples. Table 15 shows the $CO_2$ permeance and $CO_2/H_2$ selectivity results for the scale-up membrane fabricated using the pilot-scale machine in comparison with those for the lab-scale membrane (M-1) prepared in the same way described in the previous examples.

As shown in this table, the results for the scale-up membrane (M-2) was in reasonably good agreement with those for the lab-scale membrane (M-1).

TABLE 15

The performance comparison of scale-up and lab-synthesized TFBA-containing membranes tested at 120° C. using air as the sweep gas.

| Membrane | Fabrication Scale | Thickness (μm) | $CO_2$ Permeance (GPU) | $CO_2/H_2$ Selectivity |
|---|---|---|---|---|
| M-1 | Lab-Scale | 15 | 97 | 108 |
| M-2 | Scale-up (pilot) | 15.1 | 96 | 110 |

Example 16: Optimization of Borate-Containing Membrane Composition Tested at 120° C. Using Air as the Sweep Gas Using an experimental design method, the composition of borate-containing membranes containing TFBA as a catalyst was optimized for test condition at 120° C. using air as the sweep gas. The membranes (15 μm thickness) with total solids composition as in Table 16 were prepared for the measurement of gas transport performances. The gas transport measurements were performed in the same way as described in the previous examples. As seen in Table 16, the membrane samples M-16 and M-22 were able to achieve $CO_2$ permeances of 100 GPU and $CO_2/H_2$ selectivities >100.

TABLE 16

The membrane compositions and transport performances of TFBA-containing membranes.

| Sample | TMAOH (wt. %) | XL-PVA-POS (wt. %) | TFBA (wt. %) | PDADMQ-F (wt. %) | $CO_2$ Permeance (GPU) | $CO_2/H_2$ Selectivity |
|---|---|---|---|---|---|---|
| M-1 | 6 | 32.5 | 2 | 59.5 | 81 | 99 |
| M-2 | 6 | 32.5 | 3 | 58.5 | 85 | 96 |
| M-3 | 6 | 35 | 2 | 57 | 72 | 109 |
| M-4 | 6 | 35 | 3 | 56 | 75 | 107 |
| M-5 | 7 | 32.5 | 2 | 58.5 | 96 | 120 |
| M-6 | 7 | 32.5 | 3 | 57.5 | 99 | 119 |
| M-7 | 7 | 35 | 2 | 56 | 90 | 130 |
| M-8 | 7 | 35 | 3 | 55 | 91 | 127 |
| M-9 | 7 | 35 | 5 | 53 | 96 | 116 |
| M-10 | 7 | 35 | 6 | 52 | 96 | 114 |
| M-11 | 7 | 36.5 | 5 | 51.5 | 93 | 127 |
| M-12 | 7 | 36.5 | 6 | 50.5 | 93 | 128 |
| M-13 | 7 | 38 | 5 | 50 | 89 | 142 |
| M-14 | 7 | 38 | 6 | 49 | 89 | 141 |
| M-15 | 7.5 | 35 | 5 | 52.5 | 99 | 117 |
| M-16 | 7.5 | 35 | 6 | 51.5 | 100 | 114 |
| M-17 | 7.5 | 36.5 | 5 | 51 | 98 | 127 |
| M-18 | 7.5 | 36.5 | 6 | 50 | 98 | 122 |
| M-19 | 7.5 | 38 | 5 | 49.5 | 92 | 137 |
| M-20 | 7.5 | 38 | 6 | 48.5 | 92 | 134 |
| M-21 | 8 | 32.5 | 2 | 57.5 | 99 | 115 |
| M-22 | 8 | 32.5 | 3 | 56.5 | 100 | 118 |
| M-23 | 8 | 35 | 2 | 55 | 93 | 127 |
| M-24 | 8 | 35 | 3 | 54 | 96 | 128 |
| M-25 | 9 | 32.5 | 2 | 56.5 | 94 | 109 |
| M-26 | 9 | 32.5 | 3 | 55.5 | 96 | 107 |
| M-27 | 9 | 35 | 2 | 54 | 85 | 123 |
| M-28 | 9 | 35 | 3 | 53 | 87 | 118 |

Example 17: Water Permeance of Borate-Containing Membranes—Effect of Substrates

Figure 12:
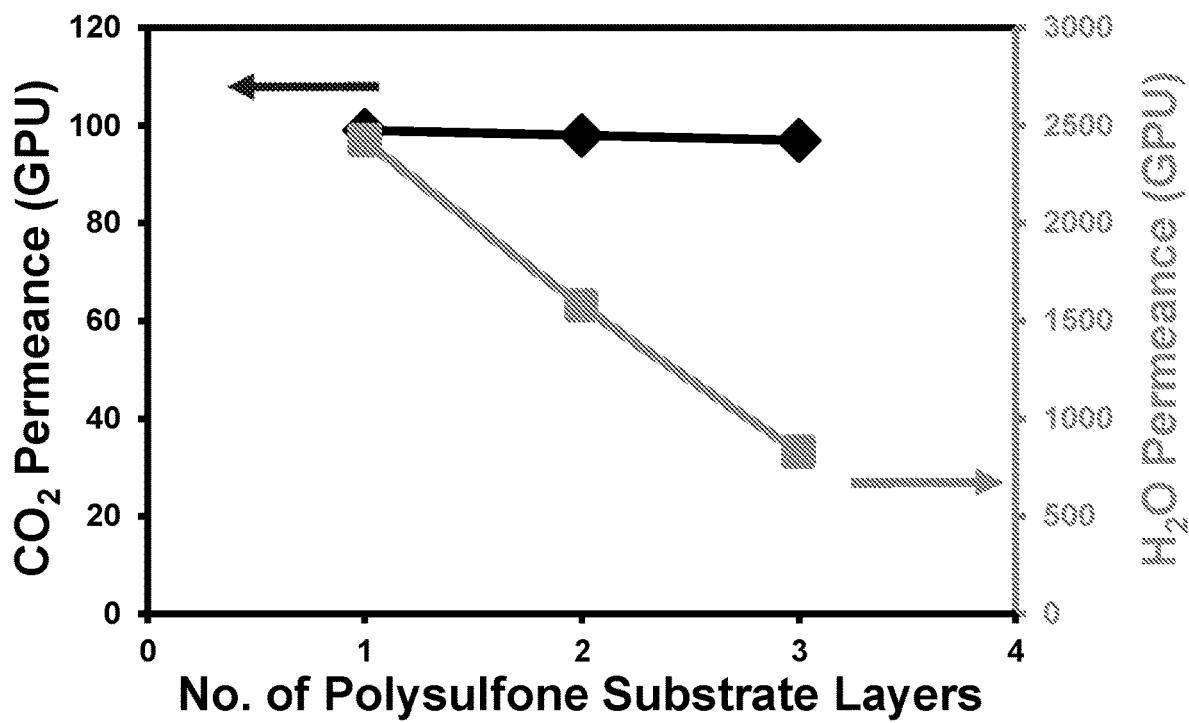
FIG. 12 is a plot illustrating the effect of the number of substrate layers below the selective layer on the $CO_2$ permeance (diamond trace) and $H_2O$ permeance (square trace) of an example membrane. The water permeance was almost linearly correlated to the number of substrate layers below the selective layer (except for nonwoven fabric) while the $CO_2$ permeance and $CO_2/H_2$ selectivity were not significantly affected by the number of substrate layers.

The effect of substrates of the borate-containing membranes containing TFBA as a catalyst on the water permeance through the membrane was explored for test condition at 120° C. using air as the sweep gas. The membranes (15 μm thickness) with total solid composition as in Table 17 were prepared for the measurement of gas transport performances. The gas transport measurements were performed in the same way as described in the previous examples. Inside the membrane cell, different additional substrates were stacked underneath the typical composite membrane as shown in Table 17, including polysulfone (PS), polyethersulfone UF10 (PES UF10), polyvinylidene fluoride (PVDF), Ohio State University polyethersulfone (OSU PES), Ohio State University hydrophilic polysulfone (OSU PES-H), and nonwoven fabric (NWF). As seen in Table 17 and FIG. 12, the water permeance was almost linearly correlated to the number of substrates below the selective layer (except for nonwoven fabric) while the $CO_2$ permeance and $CO_2/H_2$ selectivity were not significantly affected by the number of substrates. Hence, the permeation of water through the membrane can be controlled by adding layers of substrates under the membrane.

TABLE 17

The membrane compositions and transport performances of TFBA-containing membranes.

| Sample | Composition - wt. % (TMAOH:PDADMQ-F:XL-PVA-POS:TFBA) | Additional Substrates | $CO_2$ Permeance (GPU) | $H_2O$ Permeance (GPU) | $CO_2/H_2$ Selectivity |
|---|---|---|---|---|---|
| M-1 | 7:57.5:32.5:3 | 0 | 99 | 2423 | 120 |
| M-2 | | 1 PS | 98 | 1578 | 118 |
| M-3 | | 2 PS | 97 | 830 | 116 |
| M-4 | 7:56.5:32.5:4 | 0 | 100 | 2440 | 115 |
| M-5 | | PES UF 10 | 42 | 1050 | 81 |
| M-6 | | PVDF | 99 | 1345 | 114 |
| M-7 | | 2 PVDF | 97 | 930 | 114 |
| M-8 | | OSU PES | 99 | 1336 | 116 |
| M-9 | | 2 OSU PES | 98 | 761 | 115 |
| M-10 | | OSU PES-H | 100 | 1471 | 116 |
| M-11 | | 2 OSU PES-H | 99 | 810 | 116 |
| M-12 | | NWF | 100 | 1728 | 114 |
| M-13 | | 2 NWF | 100 | 1710 | 115 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:
a support layer; and
a selective polymer layer disposed on the support layer, the selective polymer layer comprising an oxidatively stable carrier and a borate additive dispersed within a hydrophilic polymer matrix,
wherein the oxidatively stable carrier is chosen from a quaternaryammonium hydroxide carrier, a quaternaryammonium fluoride carrier, and combinations thereof.

2. The membrane of claim 1, wherein the quaternaryammonium hydroxide carrier is chosen from a small molecule quaternaryammonium hydroxide, a quaternaryammonium hydroxide-containing polymer, and combinations thereof.

3. The membrane of claim 2, wherein the oxidatively stable carrier comprises a small molecule quaternaryammonium hydroxide chosen from tetramethylquaternaryammonium hydroxide, tetraethylquaternaryammonium hydroxide, tetrapropylquaternaryammonium hydroxide, tetrabutylquaternaryammonium hydroxide, and combinations thereof.

4. The membrane of claim 2, wherein the oxidatively stable carrier comprises a quaternaryammonium hydroxide-containing polymer chosen from poly(diallyldimethyl-quaternaryammonium hydroxide), poly(vinylbenzyltrimethylquaternaryammonium hydroxide), poly(2-vinyl-1-methylpyridinium hydroxide), poly(acrylamide-N-propyltrimethylquaternaryammonium hydroxide), poly(2-methacryloxyethyltrimethylquaternaryammonium hydroxide), poly(3-chloro-2-hydroxypropyl-2-methacryloxyethyldimethylquaternaryammonium hydroxide), copolymers thereof, and blends thereof.

5. The membrane of claim 1, wherein the quaternaryammonium fluoride carrier is chosen from a small molecule quaternaryammonium fluoride, a quaternaryammonium fluoride-containing polymer, and combinations thereof.

6. The membrane of claim 5, wherein the oxidatively stable carrier comprises a small molecule quaternaryammonium fluoride chosen from tetramethylquaternaryammonium fluoride, tetraethylquaternaryammonium fluoride, tetrapropylquaternaryammonium fluoride, tetrabutylquaternaryammonium fluoride, cesium fluoride, potassium fluoride, sodium fluoride, lithium fluoride, and combinations thereof.

7. The membrane of claim 5, wherein the oxidatively stable carrier comprises a quaternaryammonium fluoride-containing polymer chosen from poly(diallyldimethyl-quaternaryammonium fluoride), poly(vinylbenzyltrimethylquaternaryammonium fluoride), poly(2-vinyl-1-methylpyridinium fluoride), poly(acrylamide-N-propyltrimethylquaternaryammonium fluoride, poly(2-methacryloxyethyltrimethylquaternaryammonium fluoride), poly(3-chloro-2-hydroxypropyl-2-methacryloxyethyldimethylquaternaryammonium fluoride), copolymers thereof, and blends thereof.

8. The membrane of claim 1, wherein the borate additive comprises a borate salt.

9. The membrane of claim 8, wherein the borate salt is chosen from sodium tetraborate (STB), sodium tetrafluoroborate (STFB), potassium tetraborate (KTB), potassium tetrafluoroborate (KTFB), lithium tetraborate (LTB), lithium tetrafluoroborate (LTFB), cesium tetraborate (CTB), cesium tetrafluoroborate (CTFB), sodium dihydrogenborate (SDHB), potassium dihydrogenborate (KDHB), lithium dihydrogenborate (LDHB), sodium potassium hydrogen borate (SKHB), sodium lithium hydrogen borate (SLHB), potassium lithium hydrogen borate (KLHB), tetramethylquaternaryammonium tetraborate (TMQ-TB), tetraethylquaternaryammonium tetraborate (TEQ-TB), tetrapropylquaternaryammonium tetraborate (TPQ-TB), tetrabutylquaternaryammonium tetraborate (TBQ-TB), tetramethylquaternaryammonium tetrafluoroborate (TMQ-TFB), tetraethylquaternaryammonium tetrafluoroborate (TEQ-TFB), tetrapropylquaternaryammonium tetrafluoroborate (TPQ-TFB), tetrabutylquaternaryammonium tetrafluoroborate (TBQ-TFB), and combinations thereof.

10. The membrane of claim 1, wherein the borate additive comprises a boric acid.

11. The membrane of claim 10, wherein the boric acid is selected from tetrafluoroboric acid (TFBA), boric acid (BA), and combinations thereof.

12. The membrane of claim 1, wherein the hydrophilic polymer matrix comprises a crosslinked hydrophilic polymer.

13. The membrane of claim 1, wherein the hydrophilic polymer matrix comprises polyvinyl alcohol, polyvinylalcohol-polysiloxane, or any combination thereof.

14. The membrane of claim 1, wherein the support layer comprises a gas permeable polymer.

15. The membrane of claim 14, wherein the gas permeable polymer comprises a polymer chosen from polyamides, polyimides, polypyrrolones, polyesters, sulfone-based polymers, nitrile-based polymers, polymeric organosilicones, fluorinated polymers, polyolefins, copolymers thereof, and blends thereof.

16. The membrane of claim 14, wherein the gas permeable polymer comprises polyethersulfone or polysulfone.

17. The membrane of claim 1, wherein the support layer comprises a gas permeable polymer disposed on a base.

18. The membrane of claim 17, wherein the base comprises a non-woven fabric.

19. The membrane of claim 1, wherein the membrane further comprises a permeable layer disposed between the support layer and the selective polymer layer.

20. The membrane of claim 19, wherein the permeable layer comprises a gas permeable polymer chosen from poly(dimethylsiloxane), poly(trimethylsilylpropyne), poly(4-methyl-1-pentene), copolymers thereof, and blends thereof.

21. A method for separating a first gas from a feed gas stream, the method comprising contacting a membrane defined by claim 1 with the feed gas stream comprising the first gas under conditions effective to afford transmembrane permeation of the first gas.

22. A method of making a membrane comprising depositing a selective polymer layer on a support layer, the selective polymer layer comprising an oxidatively stable carrier and a borate additive dispersed within a hydrophilic polymer matrix, wherein the oxidatively stable carrier is chosen from a quaternaryammonium hydroxide carrier, a quaternaryammonium fluoride carrier, and combinations thereof.

* * * * *